US012730799B2

(12) United States Patent
St. Martin et al.

(10) Patent No.: US 12,730,799 B2
(45) Date of Patent: Sep. 8, 2026

(54) INTERACTIVE SEARCH AND GENERATION SYSTEM FOR SOCIAL IDENTITY OF OBJECTS DATA USING LARGE LANGUAGE MODEL(S)

(71) Applicant: Invisible Holdings LLC, Sheridan, WY (US)

(72) Inventors: Raymond Francis St. Martin, Felton, CA (US); Andrew Lee Van Valer, Reno, NV (US)

(73) Assignee: Invisible Holdings LLC, Sheridan, WY (US)

( * ) Notice: Subject to any disclaimer, the term of this patent is extended or adjusted under 35 U.S.C. 154(b) by 0 days.

(21) Appl. No.: 18/979,326

(22) Filed: Dec. 12, 2024

(65) Prior Publication Data

US 2025/0200028 A1 Jun. 19, 2025

Related U.S. Application Data

(60) Provisional application No. 63/621,939, filed on Jan. 17, 2024, provisional application No. 63/609,612,
(Continued)

(51) Int. Cl.
*G06F 7/00* (2006.01)
*G06F 16/242* (2019.01)
*G06F 40/284* (2020.01)

(52) U.S. Cl.
CPC ........ *G06F 16/2425* (2019.01); *G06F 16/243* (2019.01); *G06F 40/284* (2020.01)

(58) Field of Classification Search
CPC ............. G06F 16/3347; G06F 16/3344; G06F 16/332; G06F 16/24542; G06F 16/2455;
(Continued)

(56) References Cited

U.S. PATENT DOCUMENTS 9,886,479 B2 2/2018 Bastide et al.
10,459,989 B1 10/2019 Haahr et al.
(Continued)

FOREIGN PATENT DOCUMENTS

WO PCT/US2024/059868 12/2024
WO PCT/US2025/011931 1/2025
(Continued)

OTHER PUBLICATIONS

PCT Application No. PCT/US2024/059868, International Search Report and Written Opinion dated Feb. 24, 2025.
(Continued)

*Primary Examiner* — Mohammad A Sana
(74) *Attorney, Agent, or Firm* — Polsinelli LLP

(57) ABSTRACT

Machine learning based processing systems and techniques are described. In some examples, a machine learning based processing system analyzes text-based input to extract a plurality of natural language elements from the text-based input. The text-based input is associated with an object. The machine learning based processing system generates a prompt from at least a subset of the plurality of natural language elements. The machine learning based processing system analyzes the prompt by using a trained machine learning model to generate a response. The response is responsive to the prompt. The machine learning based processing system analyzes the response to extract a plurality of media content elements from the response. The plurality of media content elements corresponds to different aspects of the object.

20 Claims, 10 Drawing Sheets

Related U.S. Application Data filed on Dec. 13, 2023, provisional application No. 63/609,610, filed on Dec. 13, 2023.

(58) Field of Classification Search

CPC ........... G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06F 40/288; G06F 40/289; G06F 40/295; G06F 40/242; G06F 40/40; G06F 40/30; G06F 40/205; G06F 40/105; G06F 40/106; G06F 40/186; G06F 40/211

See application file for complete search history.

(56) References Cited

U.S. PATENT DOCUMENTS

| | | | | |
|---|---|---|---|---|
| 10,594,831 | B2 | 3/2020 | St. Martin et al. | |
| 10,621,183 | B1 | 4/2020 | Chatterjee et al. | |
| 10,713,289 | B1 | 7/2020 | Mishra et al. | |
| 11,809,383 | B2 | 11/2023 | St. Martin et al. | |
| 12,147,455 | B2 | 11/2024 | St. Martin et al. | |
| 12,147,456 | B2 | 11/2024 | St. Martin et al. | |
| 12,169,500 | B1 * | 12/2024 | Sun | G06F 40/205 |
| 2006/0167842 | A1 | 7/2006 | Watson | |
| 2009/0157667 | A1 | 6/2009 | Brougher et al. | |
| 2013/0246063 | A1 * | 9/2013 | Teller | G10L 13/033 704/235 |
| 2013/0297464 | A1 | 11/2013 | Jaquez et al. | |
| 2015/0261859 | A1 | 9/2015 | Isensee et al. | |
| 2016/0034565 | A1 | 2/2016 | Bastide et al. | |
| 2017/0235792 | A1 | 8/2017 | Mawji et al. | |
| 2017/0316181 | A1 | 11/2017 | Kass-Hout et al. | |
| 2019/0325068 | A1 | 10/2019 | Lai et al. | |
| 2020/0125600 | A1 * | 4/2020 | Jo | G06F 16/784 |
| 2022/0300538 | A1 | 9/2022 | Chrapko et al. | |
| 2023/0153546 | A1 | 5/2023 | Peleg et al. | |
| 2023/0325396 | A1 | 10/2023 | Hendrickson et al. | |
| 2025/0013441 | A1 * | 1/2025 | Schneider | G06F 8/41 |
| 2025/0021767 | A1 | 1/2025 | Dhamidharka et al. | |
| 2025/0045254 | A1 | 2/2025 | St. Martin et al. | |
| 2025/0078347 | A1 * | 3/2025 | Couleaud | G06T 7/62 |
| 2025/0117381 | A1 | 4/2025 | Revach et al. | |
| 2025/0117671 | A1 * | 4/2025 | DeVos | G06F 16/243 |
| 2025/0123736 | A1 * | 4/2025 | Zhu | G06T 11/00 |
| 2025/0181631 | A1 | 6/2025 | Chaudhary et al. | |
| 2025/0190507 | A1 | 6/2025 | Gadit et al. | |
| 2025/0217427 | A1 | 7/2025 | Gelli et al. | |
| 2025/0232024 | A1 | 7/2025 | St. Martin et al. | |

FOREIGN PATENT DOCUMENTS

| | | |
|---|---|---|
| WO | WO 2025/128879 | 6/2025 |
| WO | WO 2025/155759 | 7/2025 |

OTHER PUBLICATIONS

PCT Application No. PCT/US2025/011931, International Search Report and Written Opinion dated Mar. 12, 2025.

U.S. Appl. No. 19/026,063, US, Raymond Francis St. Martin, System for Generating and Uthenticating Social Identity of Objects Data Using Large Language Model(s), filed Jan. 16, 2025.

U.S. Appl. No. 19/272,924, filed Jul. 17, 2025 (pending, not yet published) entitled "Social Identity and Value of Objects", Continuation-in-Part of U.S. Appl. No. 18/924,128, filed Oct. 23, 2024.

U.S. Appl. No. 19/026,063, Office Action dated May 21, 2026.

PCT Application No. PCT/US2024/059868, International Preliminary Report on Patentability dated Jun. 25, 2026.

* cited by examiner

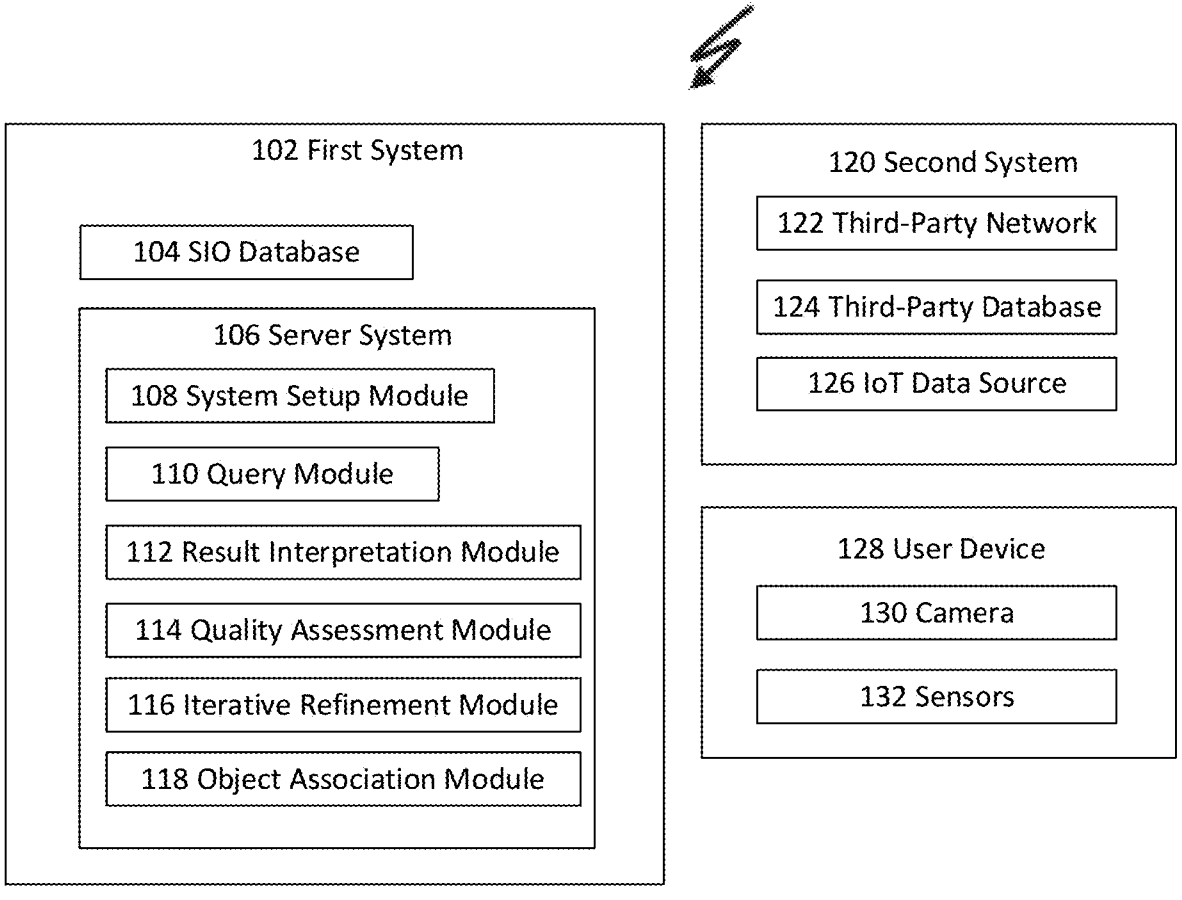

FIG. 1

| Guitar Models | Date of Manufacture | Owner | Songs Performed |
|---|---|---|---|
| 1968 Gibson Les Paul | 1968 | Carlos Santana | Black Magic Woman, Smooth |
| Fender Stratocaster | 1957 | Jimi Hendrix | Purple Haze, Little Wing |
| Gibson SG | 1961 | Angus Young | Back in Black, Thunderstruck |
| Martin D-28 | 1941 | Johnny Cash | Walk the Line, Folsom Prison Blues |
| Gibson ES-335 | 1958 | B.B. King | Lucille, The Thrill is Gone |
| Fender Telecaster | 1969 | Keith Richards | Start Me Up, Honky Tonk Women |

FIG. 2

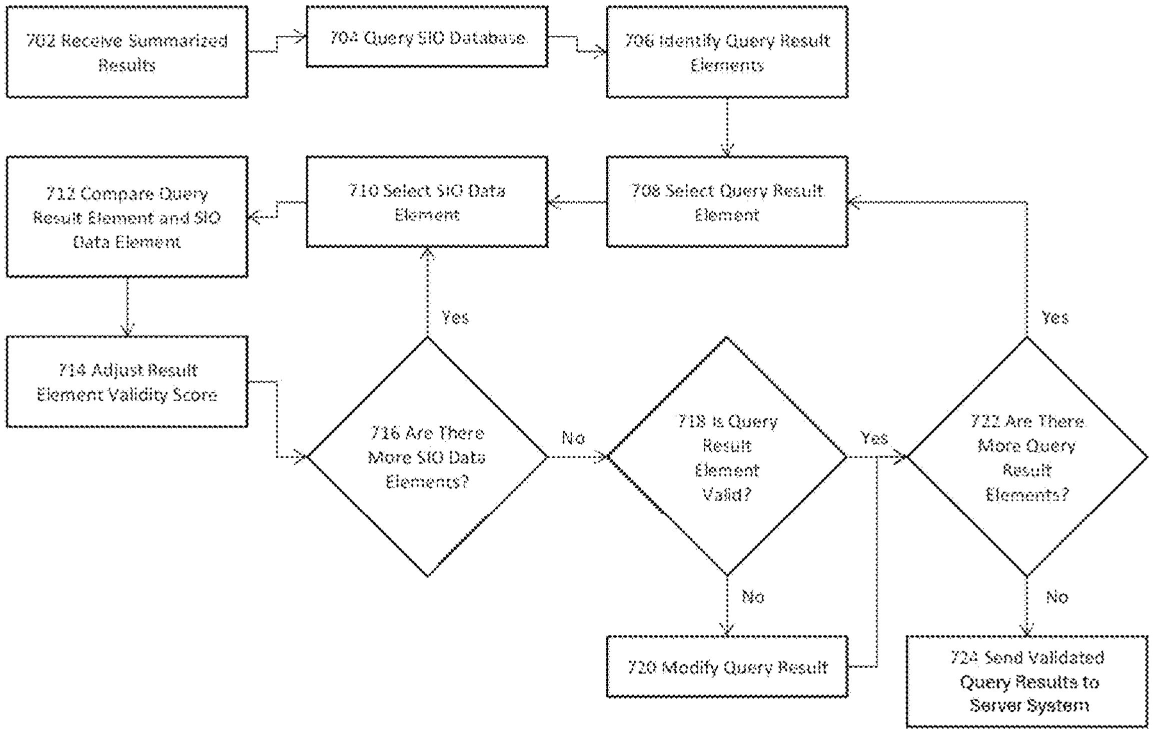

FIG. 7

| Item Description | Item Characteristics | Owner/User | Date Used |
|---|---|---|---|
| Baseball Bat | Ash wood, 34 inches long, 32 oz, Trademark branding | Babe Ruth | July 11, 1921 |
| Baseball Glove | Leather, 12 inches, infielder design, dark brown | Derek Jeter | May 29, 1999; August 14, 2000 |
| Catcher's Mitt | Reinforced padding, 33 inches, webbed design | Yogi Berra | June 10, 1952 |
| Baseball Cleats | Rubber spikes, size 10, high-ankle, black | Jackie Robinson | April 15, 1947 |
| Batting Helmet | Foam padding, adjustable fit, navy blue, face guard | Ken Griffey Jr. | July 20, 1993; April 5, 1994 |

FIG. 8

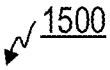
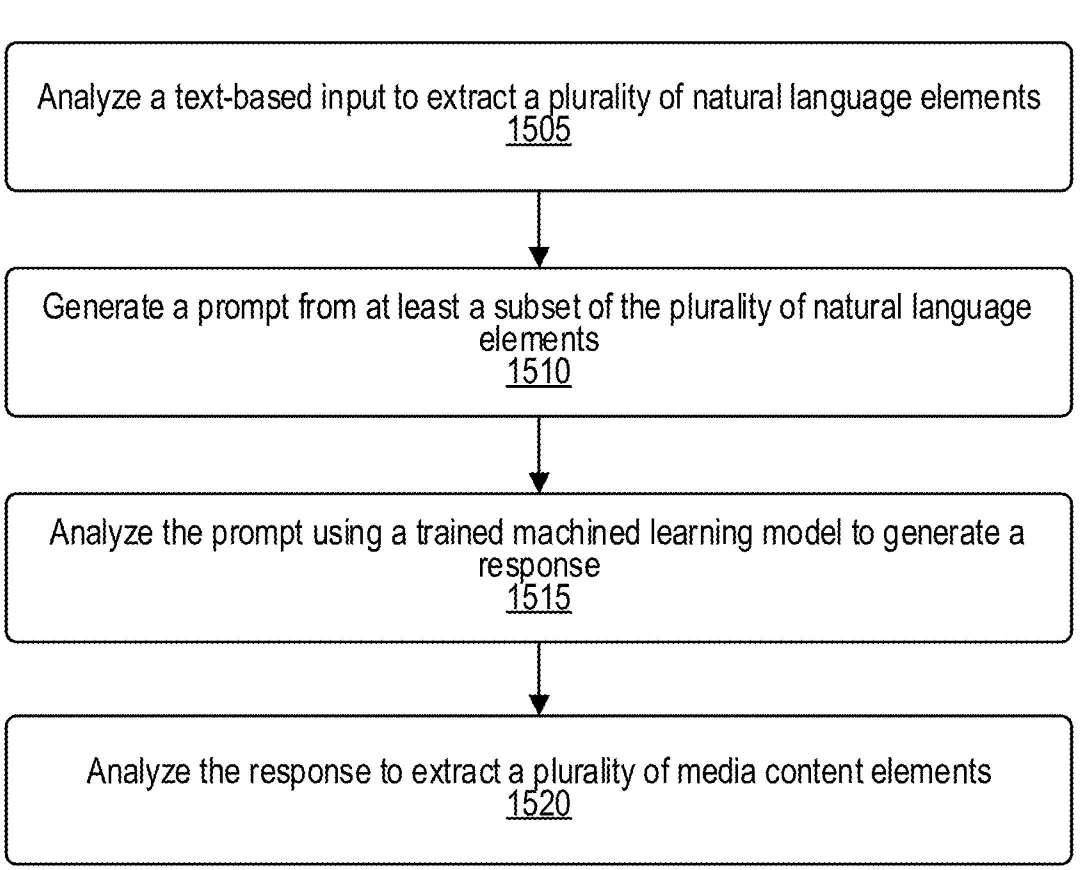
FIG. 15

INTERACTIVE SEARCH AND GENERATION SYSTEM FOR SOCIAL IDENTITY OF OBJECTS DATA USING LARGE LANGUAGE MODEL(S)

CROSS-REFERENCE TO RELATED APPLICATIONS

The present application claims the priority benefit of U.S. Provisional Patent Application No. 63/609,610 filed on Dec. 13, 2023, entitled "Interactive Search System for Social Identity of Objects Database Using a Large Language Model", U.S. Provisional Patent Application No. 63/609,612 filed on Dec. 13, 2023, entitled "Interactive AI System for Generating Creative Outputs from Social Identity of Objects (SIO) Narratives Using a Large Language Model (LLM)", and U.S. Provisional Patent Application No. 63/621,939 filed on Jan. 17, 2024, entitled "Interactive AI System for Generating Creative Outputs from Social Identity of Objects (SIO) Narratives Using a Large Language Model (LLM)", the disclosures of which are all incorporated herein by reference in their entireties.

FIELD OF DISCLOSURE

The present disclosure is generally related to searching for data associated with an object, and more specifically related to searching through a database for associated data, analyzing the associated data, and/or generating historical stories and narratives using large language models based upon a plurality of data sources.

BACKGROUND

When searching for data associated with an object, it is difficult to query a database to retrieve the data stored in the database with a non-natural language-based method. Additionally, when generating creative outputs associated with an object by utilizing the narratives based on the data stored in the database, it is also difficult to transform these narratives in the creative outputs. Therefore, it is desirable to devise a way to facilitate interactive search of the database and transformation of narratives.

SUMMARY

Examples of the present technology include a method and a system for machine learning based processing. In some examples, a machine learning based processing system analyzes text-based input to extract a plurality of natural language elements from the text-based input. The text-based input is associated with an object. The machine learning based processing system generates a prompt from at least a subset of the plurality of natural language elements. The machine learning based processing system analyzes the prompt by using a trained machine learning model to generate a response. The response is responsive to the prompt. The machine learning based processing system analyzes the response to extract a plurality of media content elements from the response. The plurality of media content elements correspond to different aspects of the object.

In some examples, a method for machine learning based processing includes analyzing a text-based input to extract a plurality of natural language elements from the text-based input. The text-based input is associated with an object. The method includes generating a prompt from at least a subset of the plurality of natural language elements. The method includes analyzing the prompt using a trained machine learning model to generate a response. The response is responsive to the prompt. The method includes analyzing the response to extract a plurality of media content elements from the response. The plurality of media content elements correspond to different aspects of the object.

In some examples, a system for machine learning based processing includes a memory and a processor that executes instructions in memory. Execution of the instructions by the processor causes the processor to perform operations. The operations include analyzing a text-based input to extract a plurality of natural language elements from the text-based input. The text-based input is associated with an object. The operations include generating a prompt from at least a subset of the plurality of natural language elements. The operations include analyzing the prompt using a trained machine learning model to generate a response. The response is responsive to the prompt. The operations include analyzing the response to extract a plurality of media content elements from the response. The plurality of media content elements correspond to different aspects of the object.

In some examples, a non-transitory computer-readable storage medium, having embodied thereon a program executable by a processor to perform a method for machine learning based processing. The method includes analyzing a text-based input to extract a plurality of natural language elements from the text-based input. The text-based input is associated with an object. The method includes generating a prompt from at least a subset of the plurality of natural language elements. The method includes analyzing the prompt using a trained machine learning model to generate a response. The response is responsive to the prompt. The method includes analyzing the response to extract a plurality of media content elements from the response. The plurality of media content elements correspond to different aspects of the object.

BRIEF DESCRIPTIONS OF THE DRAWINGS

The accompanying drawings illustrate various examples of systems, methods, and various other aspects of the examples. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 is a block diagram illustrating an architecture of an interactive search and narrative generation system, according to some examples.

FIG. 2 is a table illustrating exemplary details about different exemplary categories of SIO data, in accordance with some examples.

FIG. 7 is a flow diagram illustrating a process performed by result interpretation module, in accordance with some examples.

FIG. 8 is a table illustrating exemplary details about additional different exemplary categories of SIO data, in accordance with some examples.

FIG. 15 is a flow diagram illustrating an example of a process for machine learning based processing, in accordance with some examples.

DETAILED DESCRIPTION

Figure 3:
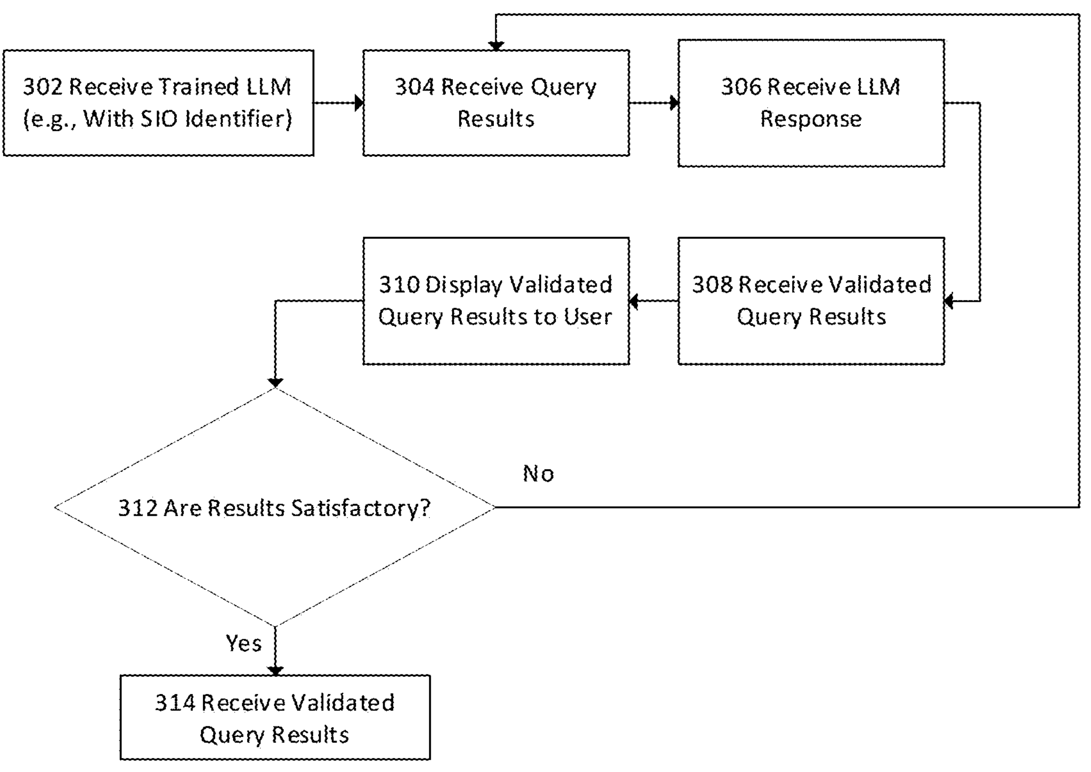
FIG. 3 is a flow diagram illustrating a process querying the SIO database performed by the server system, in accordance with some examples.

Many of the examples described herein are described in terms of sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein.

Physical, digital representations, and digitally native objects have origin stories and narratives, having either been made by someone, something, some event, somewhere, at some time.

In some examples, virtual objects, referred to herein also as data elements, can provide details about various properties of an object, subjects and/or events and/or people related to the object, and so forth. An object boundary may change over time, but it has a visible, machine readable, human comprehensible or tangible surface and specific properties. The aggregation of data from a plurality of sources may facilitate the creation of a narrative, story or timeline of events which may document such changes.

For example, a ball is spherical. However, the sphere may have unique properties (i.e., a tennis ball is fuzzy, a marble is smooth, a golf ball has surface dimples, or a combination thereof). Therefore, the form of a sphere may have infinite properties attached to it. Therefore, an object has an identity that may change over time, with changes capable of being tracked and annotated in real-time. The initial object identity may change based on outside physical forces or input but can also be augmented and amplified by information associated with the object itself. Such properties may be provided from a plurality of sources which may then be associated with similar accounts to create a more complete collection of properties describing the object. Such properties, the outside physical forces or inputs, and/or other information about the ball may be examples of data elements.

Data elements and objects can be enhanced by using a Social Identity of Objects (SIO) system, which may be implemented using the systems and methods discussed herein.

An SIO system, and its technical framework of data and information, seamlessly associate all relevant information about a specific object and provide an increasingly valuable currency as a repository, sharing, and exchange platform. Examples of the SIO system may comprise the aggregation of a plurality of data sources and types of data to create a cohesive narrative, story, timeline, view of relationships, or account of an object or collection of objects. An aggregation of data related to a person, place, and/or event from a plurality of sources may provide a more complete description of said person, place, and/or event, including context which might otherwise be overlooked or missing.

The technologies discussed herein allow an individual to interface with various devices that enable an enhanced understanding of the status and context of an object. For example, sensors can monitor systems and operating components of a house, and fitness trackers can help individuals understand more about their body's physical characteristics and performance. Objects can now combine technologies from multiple areas and integrate them into new infrastructures, providing a more robust and contextual experience for the user. As this process continues to grow and develop, every physical object could be identified with a unique internet address, allowing additional ways to experience and interact with physical objects and associated events connected to those objects. The contextual information associated with physical objects shape how users interact and connect the physical and virtual worlds. A plurality of data types, formats, sources, or a combination thereof, may be used to compile a story about a person, a place, an event, an object, or a combination thereof. Likewise, the interfaces for interacting with such stories may comprise any of a display screen, a holographic display, augmented reality, virtual reality, or a combination thereof. In some examples, the interface may comprise audio or a combination of two or more interfaces. Interfaces may further allow for interaction with other users.

Accelerating technological developments can allow people to interact with objects on a new level in the virtual world via augmented reality (AR) and artificial intelligence (AI) capabilities. Information layers and narratives from various sources will be associated with specific objects, events, and products—enhancing value, engagement, and relationships with these objects, essentially creating a mixed reality environment with the convergence and synchronization of the real and virtual worlds. The SIO is implementing a personal approach to capturing, analyzing, and displaying data, realizing that subjectivity and context can play a defining role in understanding objects, events, social changes, and culture.

The systems and methods discussed herein are associated with processes of discovering objects through a system of relationships, attributes, and context of specific objects. Searches can be made in various ways and can be associated with a single type or choice of the different types of searches outlined hereafter. The searches can be made based on any attributes or relationships of the SIOs within a single database or group of public or private databases.

Search examples can include color, size, date, retailer, container size, and relationships to other SIOs connecting unlimited associations or attributes attached with each type of registered or non-registered user by a menu or general search driven by choices.

Individual users can deploy unique search criteria based on their specific requirements. For example, a consumer might wish to see the complete narrative history of an object or product in any possible views—limited, for instance, to publicly available information only. Conversely, an individual might wish to explore the history of an object (i.e., sporting memorabilia) through associated narratives and recollections via a network of private databases.

A manufacturer can choose to see the totality of details and attributes of all component materials, transportation, and pricing from the time of product inception. A pharmaceutical distributor can have access to the entire product lifecycle, including its effects on the SIO such as feelings, returns, side effects, and/or propensity to repurchase. In one example, the systems and methods described herein can integrate and use narrative history, product lifecycle, and associated technologies and processes.

Data may be referred to as "raw information" that can originate in any format, such as a recorded song, song lyrics, album art, promotional images, interviews, or a combination thereof. Information is any data that can be collected, formatted, digitized, produced, distributed, understood, deployed, and transmitted to the user/viewer/receiver. While the concept of information is exceptionally broad, it can include anything from personal narratives, stories, conversations, art literature, visual images, and multi-media.

When information is entered into and stored in an electronic database, it is generally referred to as data. After undergoing processing and retrieval techniques (e.g., associating attributes, characteristics, qualities, traits, elements, descriptors, and other associated data formatting) output data can then be perceived as useable information and applied to enhance understanding of something or to do something. Examples of the systems and methods described herein may relate to information as elements of a story or a story itself which may be an aggregation of information.

Data processing can take place within a framework or system, divided into three distinct stages. First, data are collected, gathered, and/or input from various sources, such as retail locations, manufacturers, distributors, museums, educational organizations, service centers, sensors, and individuals. Second, data are sorted, organized, cleansed, and input into a digital repository, database, and/or system. Third, data are transformed into a suitable format that users can understand and use.

Quality data can be required for transformation into quality information. For instance, quality data must come from a reliable source (e.g., quality consistently exceeds a threshold), be complete without missing details, have systems in place to eliminate duplicated data, add relevance and value to the database to generate meaningful information, and be current and timely.

The systems and methods described herein can integrate multiple information types (e.g., collected, formatted, digitized, and/or distributed, or a combination thereof) and associated technologies and processes.

Examples of the systems and methods described herein may relate to information as elements of a story or a story itself which may be an aggregation of information. When information is entered into and stored in an electronic database, it is generally referred to as data. In some examples, the systems and methods described herein can integrate multiple data types, determine quality of the data, and format the data. For example, using the systems and methods discussed herein, a system can utilize various data search view techniques in its system framework to access data and transform it into usable information. These include a holistic or comprehensive view, which refers to the complete data set "picture." This view looks at the data throughout its entire lifecycle—from the moment an object originates until the information is needed by a manufacturer at the current moment of retrieval. An example of such a holistic view may outline a story, including data elements from multiple data sources, aggregated according to a common subject, theme, or query.

The holistic data approach is designed to improve data analysis and integration by enabling information to be distributed across multiple platforms and systems efficiently and consistently. The first component of the holistic data process includes data collection-assembling information from a variety of sources, both public and private. Data collection can be compiled and identified from structured, semi-structured, and unstructured sources, including operational systems (i.e., CRM, financial systems), website information, social media, and user-supplied narratives and stories.

The second component includes data integration and transformation, coalescing disparate data from multiple sources into an easily accessed and usable database(s). These integrated data and information assets provide the foundation for seamless and rapid access by end-users. Data integration and transformation rely on data quality, consistency, and control. The SIO solution provides processes that are repeatable, automated, and scalable to meet future user demand.

The third component includes presenting holistic data in a meaningful format(s) when requested, maintaining and supplementing data within a structural framework, and/or increasing in value over time will remain a source of evolving relevance to users. Presentation techniques can uncover key metrics, trends, and exceptions and offer customized and unique visualizations.

The fourth component includes maintaining data quality and consistency for the long-term viability of holistic data. The SIO can deploy tactics including identifying data quality thresholds, fraud alerts, audit report functionality, and robust data governance protocols. All SIO master data repositories and data privacy strategies can be applied to all users.

The SIO represents the life story or narrative of objects, which can encapsulate a wide variety of elements including but not limited to the object's location across time and space, its visual attributes, relationships with other entities, and its interactions or effects on human and non-human entities. The dynamic nature of these narratives facilitates a rich, multi-dimensional representation of objects which transcends the static attributes typically associated with objects. An SIO database stores the SIO data describing virtual and/or physical objects in a structured manner, which allows a more efficient, natural language-based method for querying the SIO database.

The systems and methods discussed herein provide an interactive search system powered by a Large Language Model (LLM) that facilitates a more intuitive and interactive way of querying the SIO database using natural language prompts. Additionally, the systems and methods described herein provide an interactive transformation of SIO narratives into a wide array of creative outputs, and may reduce the need of manual effort and skill dependency, enabling a broader demographic to engage in creative productions leveraging the comprehensive SIO data.

LLMs may benefit from SIO data which can verify the validity of data based at least upon the reliability of the source of the data and corroboration of data from a plurality of sources, ideally sources which are highly reliable. The reliability of SIO data can improve and verify the accuracy of responses provided by LLMs.

LLMs and AI systems in general can also benefit from SIOs being created for each source, and creating a trust rating for each source based on its social identity. Such a use of SIOs in tracing the source information for each LLM output can give users—prompters, readers, licensors—a view into the source material's creator, history, publication information, social influence, public reaction, related content, related objects. Further, using SIOs allows for proper accreditation and enforcement of copyright from the LLM. For example, inventors can see a future issue with plagiarism as users of LLMs take credit—as original authors—for LLM outputs. Additionally, each output of an AI is given an SIO code which allows it to be identifiable in any social identity of object or digital system.

A humanistic view of data or human-centric approach is intended to provide personalized experiences for the user, offering a revolutionary future for data visualization. Unlike the traditional methodology where questions are asked, and answers are found, the humanistic view of data is contextual or related to a specific object, circumstance, event, or relationship. Data views are transformed into visual representations in this process, adding considerable substance and context to the experience.

The SIO systems disclosed herein leverage information from individuals with a personal connection, or interest in specific music recordings, events, and/or cultures. The SIO systems can implement a personalized approach to how data associated with music is captured, analyzed, and displayed, acknowledging that subjectivity and context can play a pivotal role in understanding musical objects, events, social changes, and culture. The SIO systems analyze received data to understand the values and needs of people in the larger context of their lives (e.g., the aggregation of musical data forming a narrative or story).

In some examples, the systems and methods described herein can integrate and use chronological and/or historical data views, timelines, and processes for music recording attribution. Chronological, historical, or timeline view data, broadly considered, is collected about past events and circumstances related to a specific object, information set, or subject matter. Historical data includes most data generated manually or automatically and tracks data that changes or is added over time. Historical data offers a broad range of use possibilities relating to music recordings, narratives, stories, concepts, procedures, and/or empirical data. Examples of the present technology relate to chronological data via improvements in the collection and aggregation of such data, including data that otherwise may not intuitively be associated with a chronological context and provide the data as a story, adding context to a chronological sequence of music events.

With increased cloud computing and storage capacities, data collection and retrieval allow for more data stored for greater periods with access by more users. Since data storage does require resources and maintenance, data life cycle management (DLM) can ensure that rarely referenced data can be archived and accessed only when needed.

Data preservation can provides users the ability to understand the past and a deeper understanding of the evolution of patterns and information over time, which provides insights and new perceptions about objects, events, and information. It further enables possible future assessments about cultures, aesthetics, symbols, social interaction, and systems. Historical data collections can originate from individuals using laptops, smartphones, tablets, or other connected devices. Data can be captured via smartphone cameras, collected via sensors, satellites and scanners, micro-chips, and massive arrays.

In some examples, the systems and methods described herein can integrate clustered view data technologies and processes. Data clusters are a subset of a larger dataset in which each data point is closer to the cluster center than to other cluster centers in the dataset. Cluster "closeness" is determined by a process called cluster analysis. Data clusters can be complex or simple based on the number of variables in the group. Data clustering can be performed using a clustering algorithm, such as centroid-based clustering, distribution-based clustering, hierarchical clustering, K-means clustering, DB scan clustering, Gaussian mixture modeling, balance iterative reducing and clustering using hierarchies (BIRCH), affinity propagation clustering, means-shift clustering, ordering points to identify the clustering structure (OPTICS), agglomerative hierarchy clustering, or a combination thereof.

Clustered data sets occur in abundance because all the events we experience and that we might wish to identify, understand, associate with specific objects and act upon have measurable durations. It, therefore, follows that the individual data points associated with each instance of such an event are clustered with respect to time. Many events associated with clustered data can be highly significant, and it is important to identify them as accurately as possible. Clustering is deployed for high-performance computing. Since related data is stored together, the related data can be accessed more efficiently. Cluster views deliver two advantages: efficiency of information retrieval and reducing the amount of space required for digital storage. Information related and frequently requested is ideal for cluster viewed data requirements.

In some examples, the systems and methods described herein can integrate multiple data visual format. Data visualization is a methodology by which the data in raw format is portrayed to reveal a better understanding and provide a meaningful way of showcasing volumes of data and information. Various methods of data visualization and viewing options can be deployed for various purposes and information sets, including but not limited to biological views, legacy views, sentimental views, significance views, monetary/financial views, consumer views, supply chain views, and social views, and other views not yet imagined. For example, in supply chain, there is a need to create data visualizations that capture the connectedness of objects through time and space in relation to variables such as materials, timelines, locations on a map, companies and humans involved in the construction, consumption and delivery of such objects. Additionally, the system may be able to display the "story" that is created and understood when these elements are combined. In one example, the system may display these objects as data as a user would see in a readout visualization, or data extraction interface. In some examples, the system may display a view that shows the layers of connectedness and relationships of objects in a grid or other rich digital media display.

A clear understanding of the audience will influence the visualization format types and create a tangible connection with the viewer. Every data visualization format and narrative may be different, and visualization types may be customized based on goals, aims, objects, or topics.

In some examples, the systems and methods described herein can integrate hierarchical database models, technologies, and processes. A hierarchical data view is defined as a set of data items related to each other by categorized relationships and linked to each other in parent-child relationships in an overall "family tree" structure. When information needs to be retrieved, the whole tree is scanned from the root node down. Modern databases have evolved to include the usage of multiple hierarchies over the same data for faster, easier searching and retrieval.

The hierarchical structure of data is important as the process of data input, processing, retrieval, and maintenance is an essential consideration. An example would include a catalog of products, each within specific categories. Categories could be high-level categories such as clothing, toys, appliances, and sporting goods-however, there may also contain subcategories within those: in clothing, there may be pants, jackets, shoes-toys might include board games, action figures, and dolls. Within subcategories, there may be even more categories and so on.

In some examples, the systems and methods described herein can integrate spherical data views and data credibility control technologies and processes. A spherical data view is a form of non-linear data in which observational data are modeled by a non-linear combination model relying on one or more independent variables. Non-linear methods typically involve applying some type of transformation to the input dataset. After the transformation, many techniques can then try to use a linear method for classification.

Data credibility is a major focus implemented to ensure that databases function properly and return quality data and accurate information to the user. In some examples of the SIO system, a weighted average technique of ensuring data quality can be utilized and includes processing a collection of each of the data attributes such as location, type of device, history, individual, current, and past relationships with other SIOs, and many others to determine the credibility of the SIO data. For example, a search for a product grown in a certain location by a specific farm might include information relating to climate, seed varietal, farm name, sustainable price, location, compliance with regulations, and organic certification. This process evaluates the average of a data set, recognizing (i.e., weighing) certain information as more important than others.

Verifying data integrity is an extremely important measure since it establishes a level of trust a user can assign to the information returned and presented. Credible data can be assured when robust data management and governance are incorporated into the system. Satisfying the requirements of intended users and associated applications improves the quality of the data by assuring the highest quality data is kept, including but not limited to accuracy from data input through data presentation, exceptional database design and definition to avoid duplicate data and source verification, data governance and control, accurate data modeling and auditing, enforcement of data integrity, integration of data lineage and traceability, quality assurance and control, or a combination thereof.

In some examples, the systems and methods described herein can integrate computer programming and blockchain technologies and processes. A blockchain framework provides a unique data structure in the context of computer programming, consisting of a network of databases/virtual servers connected via many distinct user devices. Whenever a contributor in a blockchain adds data (e.g., a transaction, record, text, or a combination thereof), it creates a new "block," which is stored sequentially, thereby creating the "chain." Blockchain technology enables each device to verify every modification of the blockchain, becoming part of the database and creating an exceptionally strong verification process. Examples of the present technology may relate to blockchain frameworks wherein media, text, or unique identifiers may be stored as blocks within a blockchain, or a story or query used to generate a story, may comprise a block or series of blocks in a blockchain.

Security provided by this distributed ledger/data process is among the most powerful features of blockchain technology. Since each device holds a copy of these ledgers, the system is extremely difficult to hack-if an altered block is submitted on the chain, the hash or the keys along the chain are changed. The blockchain provides a secure environment for sharing data and is increasingly used in many industries, including finance, healthcare, and government.

Blockchain ledgers are typically divided into three distinct types and can be managed differently by the network participants. For instance, blockchain ledger implementations can include (1) public blockchain ledgers, (2) private blockchain ledgers, and (3) hybrid blockchain ledgers. Public blockchain ledgers are open to a wide range of users where anyone can join a network and are by design "decentralized systems" where participants can read, add entries, and participate in processes. Public blockchains are not controlled by any one party. Private blockchains are open to a limited number of people and are typically used in a business environment where the content in the blockchain is not shared with the public and can be controlled by one or more parties. A hybrid blockchain implementation is a mixture of private and public blockchains that, in some examples, is not open to everyone but still offers music data integrity, transparency, and security features that are novel components of the technology. Blockchain technologies offer increased security and can accommodate highly scalable applications.

If something is fungible—it is interchangeable with an identical item—NFTs, on the other hand, are unique and non-interchangeable units of data stored on a blockchain—therefore, one NFT is not equal to another. NFTs are usually associated with reproducible digital files such as photos, artwork, historical objects, narratives, videos, and audio. The possibilities for NFTs within the blockchain framework are virtually endless because each NET is unique yet can evolve over time. The value of NFTs is in their "uniqueness" and ability to represent physical objects in the digital world.

In some examples, the systems and methods described herein can integrate non-fungible tokens (NFT). Blockchain security and cryptographic protocols make this technology increasingly attractive for business models and applications where provenance and authenticity are critical. While blockchain is well-known for applications in the cryptocurrency world, it is becoming an essential component of applications for NFTs.

In some examples, this technology can integrate non-fungible tokens (NFT). Blockchain security and cryptographic protocols make this technology increasingly attractive for business models and applications where provenance and authenticity are critical. While blockchain is well-known for applications in the cryptocurrency world, it is becoming an essential component of applications for NFTs.

If something is fungible—it is interchangeable with an identical item—NFTs, on the other hand, are unique and non-interchangeable units of music data stored on a blockchain—therefore, one NFT is not equal to another. The possibilities for NFTs within the blockchain framework are virtually endless because each NET is unique yet can evolve over time. The value of NFTs is in their "uniqueness" and ability to represent physical objects in the digital world. Examples of the present technology may relate to the creation, recording, preservation, sale, or exchange of music data NFTs.

Once an NFT is created for a music recording, it is assigned a unique identifier on the chain it is created on that assures authenticity and originality on that blockchain. Each NFT is unique on the chain it is minted on, so all the information about the token is stored on the instantiated "mined on" blockchain—meaning if one "block" in the chain fails, information still exists on another block, ensuring the NFT remains safe and secure indefinitely.

The unique capabilities of blockchain technology coupled with NFTs guarantee the authenticity, originality, and longevity of objects, artwork, cultural items, and music tracks, among a host of other categories. With blockchain technology, it is impossible to copy or reproduce an NFT, and ownership can be recorded unalterably (or a way in which alteration(s) are detectable).

Tracking and exchanging real-world assets in the blockchain can assure that the asset has not been duplicated or fraudulently altered. NFTs are not limited to purely digital items, but digital versions of objects from the physical world can be attached to specific narratives and stories. Unlike digital media, represented by codes and numbers-physical objects are separate entities that can carry intuitive connections.

Human memories can be connected to a physical object providing meaning and context for the viewer. For example, a toy may be linked with a story that can transport the viewer back to a childhood experience—not necessarily connected to any monetary value but a narrative memory wrapped within the object itself. In other examples, narratives can be associated with anything, from a book of recipes passed from one generation to the next or table favors from a wedding.

One example of the systems and methods described herein can occur in cultural heritage preservation. Collecting and preserving cultural heritage data, objects, and associated narratives allow communities to interact with historical and culturally relevant artifacts and objects in unique and novel ways. These objects communicate with the viewer through the memories we associate with them. Global historical events and objects are inextricably linked to personal histories.

Internet connectivity allows "connected objects" to be more useful and interactive in conjunction with the use of enhanced programming platforms, sensors, AI, Augmented reality, intuitive applications. The power to connect stories and narratives with objects, and share the resulting combination, helps share information and stories efficiently and flexibly.

"Historocity" or "Historacity," as defined herein, is a specialized metric designed to quantify the aggregated historical value of an artifact, or a collection thereof. Unlike the traditional concept of historicity, which is limited to the verification and authentication of historical events, characters, or phenomena, historocity expands the scope to include three additional dimensions: popularity, trust or certification, and historical value associated with objects. Popularity is measured by the level of public attention an artifact or its associated elements have garnered over time, through public mentions, scholarly references, or social interactions. Trust or certification quantifies the level of confidence in the provenance or authenticity of the artifact, established through expert opinions, credentials, or documented evidence. The value associated with objects allows for comparison of other similar objects across many domains, monetary value being the most obvious. For example, two nearly identical baseballs may sell for entirely different orders of magnitude based on the stories told about them, e.g., a slightly used baseball may sell at a yard sale for $2 after a member of the household has lost interest in the sport, compared to Mark McGwire's No. 70 in 1998 baseball, which sold for $3 million. The calculation of historocity integrates these multidimensional data points to produce a composite value that can be represented numerically or categorically. In some instances, this value is further refined by integrating social or sentimental factors, yielding an even more comprehensive value termed "aggregated historocity." This aggregated value not only serves as a holistic measure of the artifact's historical significance but also holds transactional utility. It can be sold, transferred, willed, or loaned either independently of the physical artifact or in conjunction with it. Historocity provides a robust framework for evaluating the comprehensive historical significance of artifacts and collections, offering utility for curators, researchers, and collectors alike.

The SIO and their associated historocity scoring system present a method of determining an object's significance based on a combination of various value systems such as social and relationship values, historical values, sentimental value, spiritual value, environmental value, educational value, and many other as of yet defined derivative values. By integrating these multifaceted value systems into the historocity scoring, the SIO offers a comprehensive, nuanced, and culturally sensitive method to ascertain an object's importance in a given context.

To further expand on the historocity scoring system in the SIO, other value systems may be considered. Incorporation of emotional value addresses the complex spectrum of human feelings attached to objects or experiences. This encompasses not only positive sentiments like joy and nostalgia but also accounts for potential negative associations. Understanding that our connections with items aren't merely functional but deeply emotional provides a holistic view of an object's significance. Location value accentuates the importance of geographical positioning in determining an object's relevance. Economic and social attributes of a location, combined with factors like access to essential amenities and safety, play a pivotal role in an object's value. This dimension not only provides context but also highlights the dynamic interplay of market forces and socio-economic conditions in shaping perceptions of value. Intrinsic value incorporates a philosophical perspective of the value of an object, emphasizing the inherent worth of an object or entity, irrespective of its market-driven or functional value. Spatial value can be considered in terms of, for example, urban planning and architecture, stressing the value derived from specific spatial contexts, e.g., a certain amount of square or cubic footage may have some value regardless of (or despite) its contents. Physical value may be tangible metrics on the material properties and performance capabilities of objects.

The historocity scoring system for SIO management may further incorporate or reflect upon various additional value paradigms, including Fiat value, the cryptocurrency value, the intellectual value, moral value, cultural value, regional value, human value, social justice, and overall well-being. Such a system promotes respect, autonomy, sustainability value business value economic value, self-value, instrumental value, and health value.

In the SIO network, a Historocity scoring system is introduced to facilitate the exploration and ranking of individual objects and collections. The system computes relative scoring metrics based on multiple value systems, both mentioned and unmentioned. Users can evaluate and order objects or collections in accordance with these metrics, providing flexibility to accommodate any past, present, or future value system for comprehensive object assessment.

Some illustrative and non-limiting examples of this disclosure, illustrating its features, are discussed in detail with respect to the figures.

It can be noted that as used herein and in the appended claims, the singular forms "a," "an," and "the" include plural references unless the context clearly dictates otherwise. Although any systems and methods similar or equivalent to those described herein can be used in the practice or testing of examples, only some exemplary systems and methods are now described.

FIG. 1 is a block diagram illustrating an architecture of an interactive search and narrative generation system 100, according to some examples. The interactive search and narrative generation system 100 is a system that can collect and store an SIO, and use the stored SIO data to generate a refined media content. The interactive search and narrative generation system 100 consists of building blocks, which are objects with rich data attributes such as SIO data. These objects may be created and edited by users or automatically by modules.

The interactive search and narrative generation system 100 comprises a first system that may collect, create, and store SIO data and code for instantiated and parsed objects (e.g., SIOs). The first system 102 enables instantiation of SIO data for each object in the system, and recommends data based on time, place, space, written tags, photos, videos, descriptions, commonality, and emotions to be displayed through an interface, among other functions. The first system 102 may further be used to assess and verify the accuracy of an object or story which may be comprised of one or more objects. Truth may be based upon verifiable facts, or by corroborating one or more objects with one or more similar or verifiable accounts. For example, a plurality of accounts may describe the series of events during a baseball game. While the perspectives of each account may vary, some common elements can be corroborated such as the teams and players involved, the location and time of the game, the weather during the game, the plays which occurred, or a combination thereof. Verifying common details may provide confidence that the source of the data is trustworthy and therefore their account can be trusted. By contrast, if elements of an individual's account conflicts with the majority of other accounts, then the individual may be deemed less trustworthy, and therefore their story may not be trusted.

The first system 102 may additionally aggregate data, such as data about human history, and upon selection of one or more parameters, may generate a story comprised of one or more relevant accounts of subjects, events, and/or locations which may then be structured, such as in the chronological order of events, or as locations and/or features as a map, before being presented to a user. The SIO database 104 stores data within the first system 102. The data may comprise at least a plurality of objects and attributes describing a social identity of the objects. A social identity may comprise aggregated data from a plurality of sources which may include objective, factual data, or subjective accounts relating to the object. For example, accounts may comprise performances by Carlos Santana from the perspectives of Carlos Santana, concert attendees, concert staff, an audio engineer, a producer, or a combination thereof.

The server system 106 initiates the system setup module 108 which selects an LLM and trains the selected LLM based on data from the SIO database 104. The trained LLM is received, and the query module is initiated to receive an input from a user, generates a query capable of retrieving data from the SIO database 104, and receives data from the SIO database 104. The result interpretation module 112 is initiated which creates and submits a prompt to the trained large language model and receives a response which may, for example, summarize the query results into a natural language format. The quality assessment module 114 is initiated which compares the response generated by the large language model and compares the response to data form the SIO database 104 to determine whether the generated response is accurate, and if necessary, to modify the response so that the response is accurate. A validated result is received and is displayed to the user. If the results are satisfactory, the system ends, otherwise the query module 110 is initiated to receive additional user input to further refine the query and results.

The system setup module 108 may query one or more third-party networks 122 to retrieve one or more LLMs. A large language model is selected from the one or more LLMs and the SIO database 104. The SIO data is used to train the selected LLM which is then returned to the server system 106. The query module 110 receives input from a user. Input elements are identified from the user input, which may correspond to types of objects which may have a social identity stored in the SIO database 104. A structured query, such as is suitable for querying the SIO database 104 is generated and the SIO database 104 is queried for data corresponding to the generated structured query. The query results are sent to the server system 106. The result interpretation module 112 receives query results which are used, at least in part, to create a prompt. The prompt is submitted to the trained large language model and a response is generated. The generated response, which may summarize the query results, is sent to the server system 106. The quality assessment module 114 receives summarized results and queries the SIO database 104. One or more query result elements are identified from the summarized results and a query result element, and the SIO data elements are selected and compared. A validity score may be adjusted based upon the compared elements, such as increasing the validity score if the compared elements are consistent and/or decreasing the validity score if the compared elements are inconsistent indicating an inaccuracy in the summarized response. The process is repeated for all relevant SIO data elements, and it is determined whether the query result element is sufficiently valid to be considered accurate. If the query result element is determined to be invalid, then the summarized results may be modified to correct the identified inaccuracy. The process is repeated for all identified query result elements and the validated query results are sent to the server system 106.

Additionally, the server system 106 initiates the system setup module 108, which selects and trains an LLM. The trained LLM is received and the query module 110 is initiated, which receives user input and generates an LLM query and receives a response from an LLM. The LLM response is received and the iterative refinement module 116 is initiated, which receives one or more LLM responses. Next, the iterative refinement module 116 identifies one or more content elements in the LLM responses, generates an LLM query, and receives and LLM response for each element. The iterative refinement module 116 repeats this process for all content elements. The LLM responses are assembled into refined content which is received. The object association module 118 is initiated which receives refined content, queries the SIO database 104, and selects a content element and an SIO data element and compares them. If the selected elements are related, they are associated, linked and/or referenced. The object association module 118 repeats this process for all combinations of elements. The associations are received, and it is determined whether to create additional products. If additional products are needed, then initiate the query module 110 and repeat the process, otherwise end the narrative generation process.

Again, the system setup module 108 may query one or more third-party networks 122 to retrieve one or more large language models. A large language model is selected from the one or more large language models and an SIO database 104. The SIO data is used to train the selected large language model which is then returned to the server system 106. The query module 110 receives input from a user. Input elements are identified from the user input, and an LLM query is generated and an LLM response is received. The received LLM response is displayed to a user, and it is determined whether the LLM response is acceptable. If unacceptable, feedback is received via user input and an LLM query is generated and an LLM response is received. The LLM response is then sent to the server system 106.

The iterative refinement module 116 receives one or more LLM responses and identifies content elements. A content element is selected, and an LLM query is generated, and a response received. The LLM response is displayed to a user, and it is determined whether the LLM response is acceptable. If unacceptable, feedback is received via user input and an LLM query is generated and an LLM response received. The iterative refinement module 116 repeats this process for all content elements and the acceptable LLM responses are assembled into refined content, such as a narrative. The narrative is then sent to the server system 106.

The object association module 118 receives a refined content, such as a narrative and/or queries from the SIO database 104 for data related to the refined content. A content element from the refined content is compared with an SIO data element to determine if the elements are related. If they are related, the object association module 118 creates a reference, a link, and/or an association (e.g., by having shared parameters and/or characteristics). The object association module 118 repeats this process for all combinations of content elements and SIO data elements. The associated SIO element references and refined content are sent to the server system 106.

In some examples, the object association module 118 operates by receiving refined content and querying an SIO database 104 for data pertinent to this content. The object association module 118 identifies and selects specific content elements within the refined content and compares these with corresponding SIO data elements. If a relationship between the content and SIO data elements is established, an association (e.g., a reference or a link) is created. This process is iteratively conducted for all combinations of content and SIO data elements. The associated elements are then integrated into the refined content. The object association module's 118 capability to trace the lineage of LLM outputs back to their informing sources is facilitated through this comparison and association process.

A second system 120 is a distributed network of computational and data storage resources which may be available via the internet or by a local network. In some examples, a second system 120 accessible via the internet may be generally referred to as a public cloud whereas a second system 120 on a local network may be generally referred to as a private cloud. The second system 120 may further be protected by encrypting data and requiring user authentication prior to accessing its resources. A third-party network 122 is comprised of one or more network resources owned by another party. For example, a third-party network 122 may refer to a service provider, such as those providing social networks such as Facebook or Twitter. Alternatively, a third-party network 122 may refer to a news website or publication, a weather station, or a combination thereof. A third-party network 122 may further refer to a service provider for large language models, such as Microsoft, Google, Open AI, or a combination thereof. A third-party database 124 stores data owned by another party. For example, a third-party database 124 may store data on a third-party network 122, or may alternatively comprise archival data, historical accounts, survey results, customer feedback, social media posts, or a combination thereof. In one example, a third-party database 124 may include, for example, discography data related to the performance and recording history of Carlos Santana stored in a music production database. An IoT (Internet of Things) data source 126 is an internet connected device which may comprise one or more sensors or other sources of data. IoT data sources 126 may comprise appliances, machines, and other devices, often operating independently, which may access data via the internet, the second system 120, or which may provide data to one or more internet connected devices or the second system 120.

A user device 128 is a computing device which may comprise any of a mobile phone, tablet, personal computer, smart glasses, audio, and/or video recorder. In some examples, a user device 128 may include or be comprised of a virtual assistant. In other examples, a user device may comprise one or more cameras 130 and/or sensors 132. A user device 128 may comprise a user interface for receiving data inputs from a user. In some examples, a user interface may be a touch screen or mouse and keyboard input for a user device 128. In other examples, a user interface may be a microphone input and may further be paired with one or more speakers to enable bidirectional audio communication. A camera 130 is an imaging device or sensor 132 which collects an array of light measurements which can be used to create an image. One or more measurements within the array of measurements can represent a pixel. In some examples, multiple measurements are averaged together to determine the value(s) to represent one pixel. In other examples, one measurement may be used to populate multiple pixels. The number of pixels depends on the resolution of the sensor 132, comprising the dimensions of the array of measurements, or the resolution of the resulting image. The resolution of the camera 130 sensor 132 does not need to be the same as the resolution of the resulting image. A camera 130 may be a component in a user device 128 such as a mobile phone, or alternatively may be a standalone device. In some examples, a camera 130 may be analog, where an image is imprinted on a film or other medium instead of measured as an array of light values. A sensor 132 can be a measurement device for quantifying at least one physical characteristic such as temperature, acceleration, orientation, sound level, light intensity, force, capacitance, or a combination thereof. A sensor 132 may be integrated into a user device 128, such as an accelerometer in a mobile phone, or may be a standalone device. A sensor 132 may also be found in an IoT data source 126 or a third-party network 122.

FIG. 2 is a table illustrating exemplary details about different exemplary categories of SIO data, in accordance with some examples. An SIO database 104 stores data within the first system 102. The data stored may comprise at least a plurality of objects and attributes describing a social identity of the objects. In some examples, a social identity may comprise aggregated data from a plurality of sources which may include objective, factual data, or subjective accounts relating to the object. For example, accounts may comprise performances by Carlos Santana from the perspectives of Carlos Santana, concert attendees, concert staff, an audio engineer, a producer, or a combination thereof.

The SIO database 104 may be populated by a first system 102 which may comprise a variety of sources such as third-party networks 122, third-party databases 124, IoT data sources 126, user devices 128, cameras 130, sensors 132, or a combination thereof. The SIO database 104 is used by the system setup module 108, query module 110, result interpretation module 112, quality assessment module 114, iterative refinement module 116, and object association module 118. In some examples, the SIO database 104 may be a vector database. This vector database, integral to the large language model, may serve as a structured repository for housing multi-dimensional arrays wherein each element or vector represents a linguistic component derived from input data. The SIO database 104 is configured to facilitate efficient storage, retrieval, and manipulation of these vectors, which are generated through the analysis of linguistic elements based on attributes such as morphological, syntactic, or semantic properties. The vectors are mapped onto a multidimensional space using predefined transformation algorithms, allowing for the precise representation of complex language patterns and facilitating rapid computational processes necessary for various language modeling tasks. In some examples, the complex language patterns may be aggregated to structurally store a wide array of multidimensional vectors into the vector database, with each vector representing a linguistic component of the input data.

FIG. 3 is a flow diagram illustrating a process querying the SIO database performed by the server system 106, in accordance with some examples. At operation 302, the server system 106 receives a trained large language model from the system setup module 108, which receives the trained large language model, by querying a third-party network 122 to access, one or more large language models, and select a large language model. An SIO database 104 may be queried, and the received data may be used to train or finetune the large language model.

At operation 304, the server system 106 receives query results from the query module 110. The query module 110 first receives a query input, and identifies one or more query input elements from the query input. The query module 110 then uses the query input elements to generate a structured query and submits the structured query to an SIO database. Next, the query module 110 receives query results from the SIO database. In some examples, the query results comprise a list of guitars related to Carlos Santana.

At operation 306, the server system 106 receives a large language model response from the result interpretation module 112. The result interpretation module 112 is initiated to receive the query results from the SIO database 104 and creates a prompt based on the query results to submit to the trained large language model. Then, the trained large language model generates a response, in a natural language or another specified format (e.g., a table). The result interpretation module 112 receives the generated response and return the response to the server system 106.

At operation 308, the server system 106 receives validated query results from the quality assessment module 114. The quality assessment module is initiated to receive summarized query results and queries an SIO database 104 for data related to the summarized query results. One or more query result elements are identified from the summarized query results and a query result element is selected. An SIO data element is selected, and the selected query result element is compared to the selected SIO data element. A result element validity score is adjusted based upon the results of the comparison. If the elements are consistent and agree, then the validity score may be increased. If the elements are inconsistent and/or do not agree, then the validity score may be decreased. If there are more SIO data elements, another SIO data element is selected and the process is completed, otherwise it is determined whether the query result element is valid. If the query result element is not valid, the query result may be modified. If there are more query result elements, another query result element is selected, and the process is repeated. The validated query results may comprise a modified version of the summarized query results received from the result interpretation module 112.

At operation 310, the server system displays the validated query results to the user. The validated query results may be presented via a user interface via a user device 128. In some examples, the validated query results may be displayed as a text output. In other examples, the validated query results may be read via a synthesized voice.

At operation 312, the server system 106 allows the user to determine whether the validated query results are satisfactory. This determination may be the result of an input provided by the user. For example, the user can indicate that the result is satisfactory. In another example, the user can indicate that the result is not satisfactory. The user's indication of satisfaction may be provided as a binary response, such as yes or no. Alternatively, the user's indication of satisfaction may be based upon natural language processing of a text or verbal input where sentiment analysis is used to determine whether the user approves or disapproves of the results. In some examples, the validated query result may be given an SIO code which allows it to be identifiable in any social identify of object or digital system. Alternatively, the results may be determined to be unsatisfactory if the user provides additional inputs seeking clarification of the results. If the results are not satisfactory, the server system 106 returns to operation 304, to receive additional query results from the query module 110, to further refine the query and results. At operation 314, the server system 106 receives validated query results if the results are satisfactory.

Figure 4:
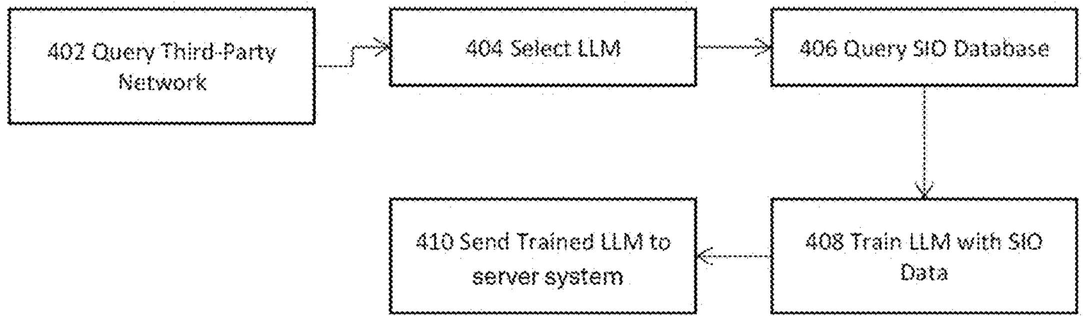
FIG. 4 is a flow diagram illustrating a process performed by system setup module, in accordance with some examples.

FIG. 4 is a flow diagram illustrating a process performed by the system setup module 108, in accordance with some examples. At operation 402, the system setup module 108 queries a third-party network 122 to establish a network connection with a service provider for an LLM. In some examples, LLMs may include those such as ChatGPT developed by OpenAI, Bing Chat developed by Microsoft, and/or Bard developed by Google. In some examples, LLMs may be open source and/or community developed. In some examples, an LLM may comprise one or more models which may vary based upon one or more of algorithm, training data, parameters, or a combination thereof.

At operation 404, the system setup module 108 selects an LLM from one or more LLMs. In some examples, an LLM may comprise a single model which may comprise an algorithm which has been trained on a specific set of data. In some examples, the model may further be fine-tuned using a second set of data. In some examples, a large language model may be a first party and/or proprietary model.

At operation 406, the system setup module 108 queries a SIO database 104. The SIO database store data defining and/or describing one or more social identity of objects and data related to those objects. In some examples, the data may comprise guitars, and the related data may comprise any of their manufacturer, owner's, maintenance history, performance history, songs played using the instrument, or a combination thereof. For example, an example object is a 1968 Gibson Les Paul Custom played by Carlos Santana.

At operation 408, the system setup module 108 trains the selected LLM with data from the SIO database 104. In some examples, training may comprise the initial training of a large language module which may include steps including tokenization of the data, prompting the model, and providing feedback to the model, such as correct or incorrect. The feedback may additionally comprise a magnitude, such as may be used by a regression model to adjust a trendline. In other examples, an LLM may be trained on data which does not include SIO data. In other examples, the large language model is trained on both SIO data and non-SIO data. In some examples, training a large language module may comprise finetuning a pre-trained large language model with SIO data. At operation 410, the system setup module 108 ends the trained large language model to the server system 106.

Figure 5:
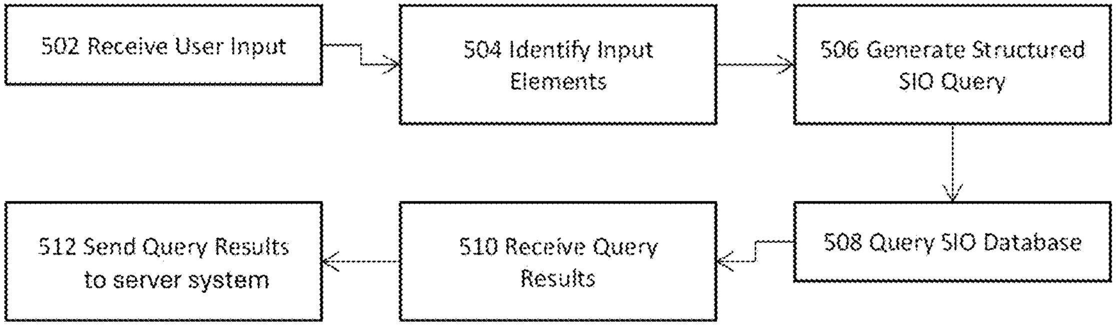
FIG. 5 is a flow diagram illustrating a process performed by query module, in accordance with some examples.

FIG. 5 is a flow diagram illustrating a process performed by the query module 110, in accordance with some examples. At operation 502, the query module 110 receives an input from a user. In some examples, the user input may indicate they wish to query the SIO using an LLM interface, such as GPT. In some examples, the input may comprise a query in the format of typed and/or verbal text. In an example, the user input may be accepted via a keyboard of a user device 128. In another example, the user input may be accepted as a voice command via a microphone connected to a user device 128. In some examples, an audio input may be processed via natural language processing, which may include the use of a large language model, to convert the received audio input into a text format. For example, the user input comprises "What guitars has Santana played?"

At operation 504, the query module 110 identifies one or more query elements. In some examples, the one or more query elements may comprise any of, people, places, objects, times, emotions, or a combination thereof, which may correspond to one or more objects which may have a social identity within an SIO database 104. For example, if the user input is "What guitars has Santana played?", example input elements may comprise guitars and Carlos Santana. In some examples, a query element may be an emotion associated with an object. For example, some sources may associate one or more of Santana's guitars with a "melancholy" sound, due to certain musical choices made with that guitar or events that took place during Carlos Santana's life while he performing with the guitar. A user could therefore query the LLM "write a poem from the perspective of Carlos Santana's guitar", and the system would understand that melancholy emotions associated with the guitar and determine a poem with melancholy elements would be most appropriate for the query. In some examples, query elements may also comprise personal associations with an object. For example, a user may query "write a story about Carlos Santana's guitar sharing the stage with another guitar legend," the system may determine that Carlos Santana performed "Fire on the Mountain" with Jerry Garcia in 1987, associate Carlos Santana's PRS with the performance, and base the story on these SIO query elements. In some examples, query elements may be used as tokens in an LLM.

At operation 506, the query module 110 generates a structured SIO query. In some examples, a structured SIO query may have a syntax, such as structured query language (SQL), or other programming syntax, which can be used to query an SIO database to retrieve data relating to the query received from a user. In some examples, the query may be a specific prompt syntax which is inputted into the LLM trained on SIO database. In one example, generating a query for guitars, which are further associated with Carlos Santana. An example of a query using pseudo code may comprise "Retrieve all objects that are 'guitars' and are associated with 'Santana'." Alternatively, the query may use SQL syntax, or an alternative syntax including open source or proprietary languages, such that the query may be submitted to an SIO database 104 which may return the requested data.

At operation 508, the query module 110 queries the SIO database 104. The SIO database 104 stores data defining and/or describing the social identities of one or more objects and data related to those objects which may comprise or relate to their social identities. For example, the SIO database 104 may comprise data related to objects including guitars, and further may comprise data related to people including Carlos Santana. The SIO data may further comprise relationships between data, which may vary in resolution, such as generally relating Carlos Santana with guitars, as he is a musician who plays the guitar, or may relate Carlos Santana with a specific guitar, such as a 1968 Gibson Les Paul guitar, and may further specify a specific guitar which may be identified via a serial number, design, blemishes, or a combination thereof. The data may further comprise a specific performance where Carlos Santana may have used the guitar, songs played on the guitar, or a combination thereof.

At operation 510, the query module 110 receives results from the SIO database 104 in response to the submitted query. In an example, the query module 110 receives data comprising a list of guitars owned, played by, and/or performed with by Carlos Santana. The guitars may be specific guitars, and/or models of guitars. In some examples, the system may determine if the SIO has a suitable response to the user's query in order to generate an effective response. It should be noted that each output of an LLM from a query is given an SIO code which allows it to be identifiable in any social identity of object or digital system. The system may alert the user to a paucity of data associated with specific SIO objects, and that this may affect the accuracy of the results. At operation 512, the query module 110 sends the query results to the server system 106. In an example, the query results may comprise a list of guitars related to Carlos Santana.

Figure 6:
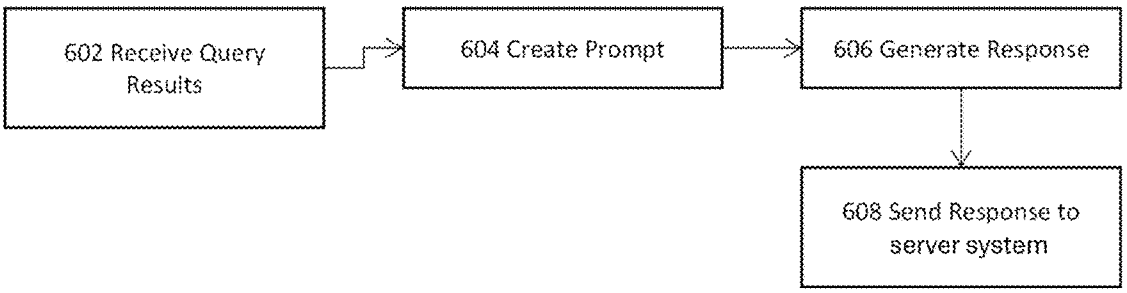
FIG. 6 is a flow diagram illustrating a process performed by query module, in accordance with some examples.

FIG. 6 is a flow diagram illustrating a process performed by the result interpretation module 112, in accordance with some examples. At operation 602, the result interpretation module 112 receives query results from the server system 106. The query results comprising a response from an SIO database 104 in response to a query generated based at least in part on a query submitted by a user. In one example, the query results can comprise a list of guitars related to Carlos Santana, as well as descriptions, histories, emotions, and other object elements associated with each of the guitars.

At operation 604, the result interpretation module 112 creates a prompt for an LLM based upon the received query results. In some examples, the prompt may be based upon the user's input, the structured query used to obtain the query results, and/or contextual data related to the query results. For example, a prompt may comprise "Summarize these results including guitars related to Carlos Santana:" followed by the list of guitars in the query results and details related to each guitar, such as whether a guitar was owned, played by, performed with, the guitar, and likewise whether a specific guitar or a model. In some examples, the prompt may include prioritization of the object description, object history, and/or object emotions, based on the user requests. For example, "write a detailed description of the physical guitar" may prioritize elements such as types of woods, finish, body shape, configuration of the electronics, or a combination thereof, compared to a prompt such as "write a love letter to the guitar from a fan" may prioritize emotional elements of the guitar, such as joyful or ecstatic solos that were performed on the guitar for millions of fans over the years.

At operation 606, the result interpretation module 112 generates a response to the created prompt by submitting the created prompt to the large language model and receiving a response in a natural language format. Alternatively, the response can be in a specific format as requested via the created prompt, such as in a table. In an example, the response comprises a summarized list of guitars related to Carlos Santana grouped by whether their relationship to Carlos Santana, such as whether he owned, played, and/or performed with, each guitar included in the query results.

In some examples, the generated prompt may contain unique SIO elements and structure such that it may not be possible to create such a prompt manually due to the precise configuration of SIO data and structure of the overall prompt. For example, the prompt could provide an accurate retelling of events specific to an objects perspective that would not be available to a user, e.g., "write a story from the perspective of Santana's guitar during the 1987 performance of Fire on the Mountain with Jerry Garcia" the final prompt would include a plurality of historical, descriptive, and emotional elements that are uniquely contained in the SIO database. In some examples, the generated prompt may further allow the system to determine whether the LLM should primarily rely on SIO database data or more typical LLM training data. For example, the prompt could specify whether or not specific details in the SIO data needed to be rigidly included in the LLM's output, or if the LLM should take a more creative approach to answering the prompt, using SIO data as a guide. In some examples, the prompt generated may provide a filter for results that scales the LLM creative output versus utilizing specific SIO data elements.

In some examples, that amount, accuracy, and quality of the SIO data may provide direction to the LLM as to how much SIO data should be relied on versus the general LLM training data. For example, if the SIO has only a small amount of data associated with a specific guitar played by Santana, the LLM prompt may indicate that the LLM should create additional details, such as the strings used on the guitar, based on the LLM training data since no SIO record exists for that information. Additionally, the LLM may attempt to predict the future of an object, which is not known to the SIO. For example, if a user prompts "what will happen to Carlos Santana's guitars after he dies?" the LLM may be able to interpolate from Carlos Santana's life and estate to determine which guitars are likely to be donated to charity, housed in a museum, retained by family members, sold at auction to private collectors, given to friends and colleagues, or a combination thereof. At operation 608, the result interpretation module sends the response from the large language model interpreting the query result into a natural language or other specific format.

FIG. 7 is a flow diagram illustrating a process performed by the quality assessment module 114, in accordance with some examples. At operation 702, the quality assessment module 114 receives the query results summarized via the result interpretation module 112 using an LLM. At operation 704, the quality assessment module 114 queries an SIO database 104 for data related to the query results summarized by an LLM. In an example, the quality assessment module 114 may query the SIO database 104 for data relating to the summarized query results. In another example, the quality assessment module 114 may query the data comprising guitar data, the data further comprising data related to guitars owned, played by, and/or performed with by Carlos Santana.

At operation 706, the quality assessment module 114 identifies one or more elements form the query results. For example, a query result element may comprise a specific guitar, such as a 1968 Gibson Les Paul. In another example, a query result element may comprise a song, Black Magic Woman, in which Carlos Santana played a guitar.

At operation 708, the quality assessment module 114 selects a query result element from one or more identified query result elements. In an example, the quality assessment module 114 may select a 1968 Gibson Les Paul guitar which was performed with by Carlos Santana.

At operation 710, the quality assessment module 114 selects an SIO data element from the data received from querying the SIO database 104. In an example, the SIO data element may comprise data related to a guitar.

At operation 712, the quality assessment module 114 compares the selected query result element and the selected SIO data element to determine whether the selected query result element is consistent with the SIO data. The SIO data is presumed to be accurate based upon at least a source reliability score. In some examples, the selected SIO data may comprise data with a source reliability score above a threshold, such as 90 of a possible 100 points, and therefore the data is highly likely to be correct. Therefore, if the selected query result element is inconsistent with the selected SIO data element, the selected query result element is at least partially inaccurate. For example, the selected query result element is a 1968 Gibson Les Paul which was played by Carlos Santana and the SIO data element comprising an account of Carlos Santana playing a 1968 Gibson Les Paul while performing the song, Black Magic Woman, therefore, the selected query result element is consistent with the selected SIO data element.

At operation 714, the quality assessment module 114 adjusts a result element validity score according to the results of the comparison of the selected query result element and the selected SIO data element. For example, the quality assessment module 114 can increase the result element validity score if the selected query result element is consistent with the selected SIO data element. In an alternate example, the quality assessment module 114 can decrease the result element validity score if the selected query result element is inconsistent with the selected SIO data element. In some examples, a result element validity score may default to zero and be increased in response to comparisons affirming its validity. In other examples, a result element validity score may default to a predefined value such as 100 and be decreased in response to comparisons which are inconsistent indicating inaccuracies. In some examples, the validity score may be increased and/or decreased based upon the results from the comparison of one or more query result elements and SIO data elements.

At operation 716, the quality assessment module 114 determines whether there are more SIO data elements which have not been evaluated. For example, when there are more SIO data elements, the quality assessment module 114 returns to operation 710 and select another SIO data element. Alternatively, when there are no more SIO data elements, the quality assessment module 114 performs operation 718, to determine whether the query result element is valid. The query result element may be determined to be valid if its validity score is above a threshold value, or if there are fewer inaccuracies or inconsistencies identified by comparisons with SIO data elements, than a threshold amount. For example, a query result element is valid as it has a validity score greater than 90%. In another example, the query result element is invalid as there were more than 5 inconsistencies identified when compared to SIO data elements. An example of an inconsistency would be if the query result element described a Taylor 610 guitar, and there were no SIO data elements identified in which Carlos Santana owned, played, and/or performed with a Taylor 610 guitar.

At operation 720, the quality assessment module 114 modifies the query result if the query result element was determined to be invalid. For example, if the query result element described Carlos Santana as having played the Taylor 610 guitar, which was not consistent with the SIO data, the Taylor 610 guitar is removed from the list of guitars he played as described in the summarized query results.

At operation 722, the quality assessment module 114 determines whether there are more query result elements which have not been evaluated. For example, when there are more query result elements, the quality assessment module 114 returns to operation 708 and selects another query result element. When there are no more query result elements the quality assessment module 114 proceeds to operation 724 to send the validated query results to the server system 106. In some examples, the validated query results may be the same as the received summarized query results. In other examples, the summarized query results may have been modified resulting in the validated query results. In some examples, the quality assessment module 114 may prevent so-called large language model "hallucinations". In the context of an LLM, a hallucination refers to an instance where the model generates output that is not grounded in factual or verifiable information, often resulting in outputs that are misleading, incorrect, or nonsensical. For example, during the processing of input data, the LLM might inaccurately weigh the significance of certain data vectors housed within the vector database, leading to the generation of fabricated or illogical content. These hallucinations may stem from anomalies or biases in the training data, inadequate model generalization, or errors in the model's prediction pathways. Addressing hallucinations is vital for enhancing the reliability and accuracy of the model, which may include refining training data, adjusting model parameters, or incorporating mechanisms to detect and rectify hallucinatory outputs during operation. The quality assessment module 114 can detect such hallucinations when the output of the LLM does not agree with the SIO database. In other examples, the quality assessment module 114 allows a copyright owner or other user to determine if, and the degree to which, a copyrighted work was used in the creation of an SIO object. The quality assessment module 114 may allow copyright owners to remove copyrighted material produced by a LLM, and/or insert appropriate attribution to copyrighted material for works generated by an LLM.

FIG. 8 is a table illustrating exemplary details about additional different exemplary categories of SIO data, in accordance with some examples. The SIO database 104 stores data within the first system 102. The data stored in the SIO database 104 may comprise at least a plurality of objects and attributes describing a social identity of the objects. In some examples, a social identity may comprise aggregated data from a plurality of sources which may include objective, factual data, or subjective accounts relating to the object. For example, accounts may comprise records related to one or more baseball games, such as those in which Babe Ruth played which may include rosters, equipment used, individuals who attended and/or participated, or a combination thereof.

Figure 9:
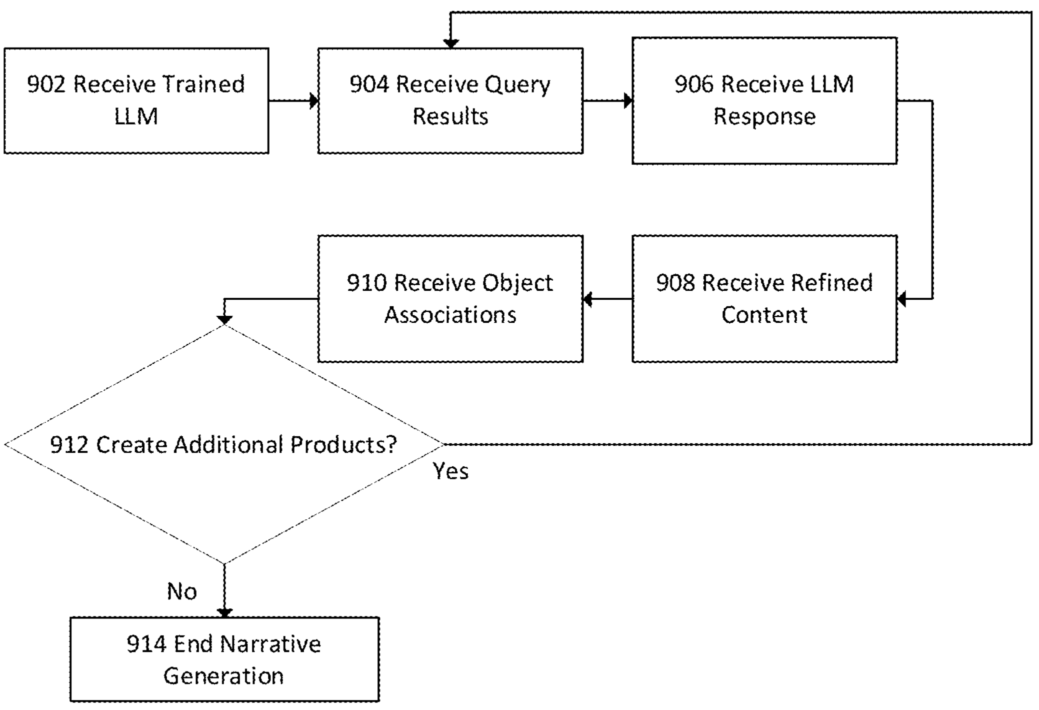
FIG. 9 is a flow diagram illustrating a process generating a refined media content performed by the server system, in accordance with some examples.

FIG. 9 is a flow diagram illustrating a process generating a refined media content performed by the server system, in accordance with some examples.

At operation 902, the server system 106 receives a trained LLM from the system setup module 108. Then, the query module 110 is initiated to receive a query input and identifies one or more input elements. The input elements are used to generate a structured query to be submitted to an LLM. Then, the structured query is submitted to an LLM and the results are received.

At operation 904, the server system 106 receives query results from the query module 110. In an example, the query results comprise at least part of a narrative describing a baseball bat owned by the user which was once used by Babe Ruth. In one example, the narrative is factual. In another example, the narrative is at least partially fictional. In another example, query results may facilitate the creation of diverse creative outputs, leveraging the depth of data from the SIO database 104 and the analytical prowess of LLMs. Beyond narratives, it can spearhead the development of a myriad of creative products such as novels, screenplays, poems, and even music compositions.

At operation 906, the server system 106 receives one or more LLM responses. For operation 906, the iterative refinement module 112 is initiated. During operation 906, the iterative refinement module 112 identifies one or more media content elements. Each media content element is selected in turn and an LLM query is generated for each media content element. A response is received from the LLM which is displayed to a user. The user determines whether the LLM response is acceptable or requires further improvement. If further improvement is required, the user provides input and another LLM query is generated. When there are no additional content elements, the content elements and detailed aggregated data are assembled into a refined content.

At operation 908, the server system 106 receives the refined content from the iterative refinement module 112. Next, the object association module 114 is initiated to receive refined content, such as a detailed narrative. The SIO database 104 is queried for data related to the refined content and one or more media content elements are identified from the refined content. A media content element is selected, and an SIO data element is selected and the selected elements are compared to determine whether they are related. If the selected elements are related, they are associated, such as by creating a reference and/or hyperlink to the SIO data element within the refined content. The process is repeated for each SIO data element and each content element.

At operation 910, the server system 106 receives SIO object associations and references within the refined content. In one example, a refined content comprising a narrative about a baseball bat which was once used by Babe Ruth references an SIO object comprising an account by a baseball player who played with Babe Ruth.

At operation 912, the server system 106 allows the user to determine whether to create additional products (e.g., output products). In an example, a user can indicate that they wish to create an additional product related to the refined content. For example, the refined content can comprise a narrative about a baseball bat which was once used by Babe ruth, and the user wants to create a pitch for the narrative so that the user can propose the narrative to a production studio to be made into a movie, therefore returning to operation 904 and initiating the query module 110.

During the same operation, users have the option to specify the format and type of creative output they desire. For instance, if a user opts to adapt the refined narrative about a baseball bat once used by Babe Ruth into a screenplay, the modules in the server system 106 may guide the structural conversion of the narrative into a screenplay format, integrating dialogues, stage directions, and character developments in alignment with the industry standards. Alternatively, if a user chooses to develop a poem, the module would engage in restructuring the content into verse form, utilizing rhythmic and poetic elements to craft a piece that resonates on an emotional level. In cases where musical compositions are the chosen output, the modules in the server system 106 can facilitate the crafting of lyrics based on the narrative, even suggesting suitable musical chords and notes that harmonize with the lyrical content, thereby creating a cohesive musical piece. Moreover, for novel creations, the module can aid in fleshing out detailed chapters, offering suggestions for enhancing plot developments, character arcs, and thematic depth, ensuring a well-rounded and engaging novel. Furthermore, the system allows for the integration of multimedia elements, such as illustrations or soundtracks, to accompany the text, providing a rich, multisensory experience for the audience. The server system 106 thus facilitates the seamless transition of narratives into various forms of art and entertainment, enhancing the potential market value and appeal of the generated content. At operation 914, the narrative generation process ends when the user does not wish to create additional products.

The iterative refinement module 112 receives one or more LLM responses and

Figure 10:
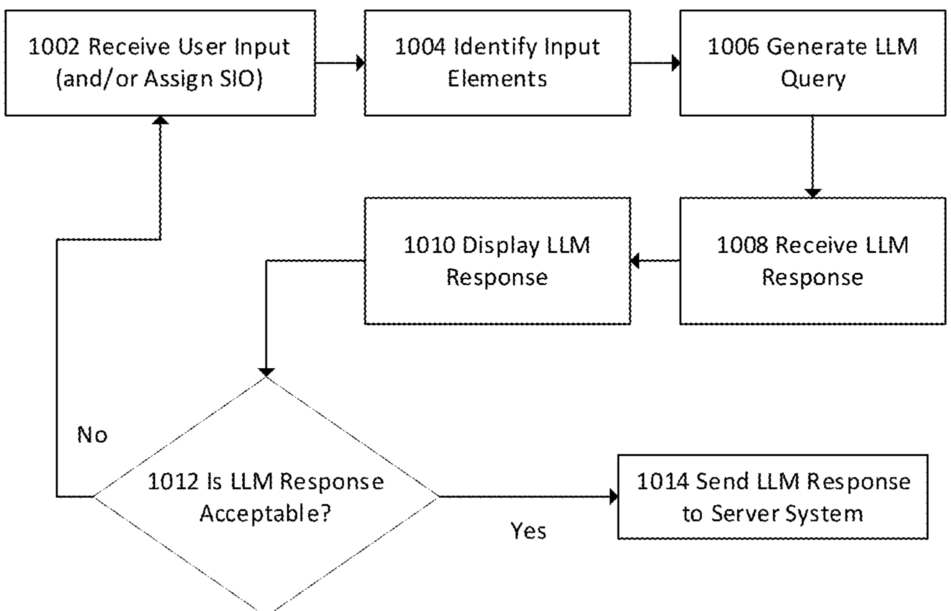
FIG. 10 is a flow diagram illustrating an additional process performed by query module, in accordance with some examples.

FIG. 10 is a flow diagram illustrating an additional process performed by query module, in accordance with some examples.

At operation 1002, the query module 110 receives an input from a user. The input may comprise a query in the format of typed and/or verbal text. In an example, the user input may be accepted via a keyboard of a user device 128. In another example, the user input may be accepted as a voice command via a microphone connected to a user device 128. Audio input may be processed via natural language processing, which may include the use of an LLM, to convert the received audio input into a text format. In an example, the user input comprises "Generate a screenplay based on the history of this baseball bat which was once used by Babe Ruth." In some examples, the user may request a factual response, a fictional response, or a mix of fiction and non-fiction, such as where a fictional story may be based upon factual people, events, or a combination thereof.

At operation 1004, the query module 110 identifies one or more query elements. In some examples, query elements may comprise any of, people, places, objects, times, or a combination thereof, which may correspond to one or more objects which may have a social identity within the SIO database 104. For example, an input element may be a baseball bat. Another input element may be Babe Ruth. Further input elements may comprise one or more games and/or at bats, where a specific bat was used.

At operation 1006, the query module 110 generates a structured query for an LLM. An LLM query may comprise a syntax such as chat markup language (ChatML). The syntax generally comprises a model, and a series of messages each comprised of a role and associated content. In some examples, the model may be implied, such as when using a predetermined or previously selected LLM. In some examples, the messages may comprise roles such as system, user, assistant, or a combination thereof. A message where the role is system typically defines the type of role that the LLM should comprise, such as an assistant. Thereafter, content associated with a role of assistant may be provided as exemplary responses which may provide a template for responses returned by the LLM. The role of user may provide prompts or queries which are to be replied to by the LLM. The content associated with a system role may provide an appropriate role for the LLM, such as an author, novelist, journalist, or a combination thereof, depending on the type of narrative which is desired. Similarly, the role assigned by a system role may be used in subsequent messages when referencing expected responses. In some examples, the example responses may be retrieved from an SIO database. In other examples, the example responses may comprise edits made by a user, or previously approved responses from the LLM as part of an iterative process, such that subsequent queries are appended to the series of messages provided in ChatML syntax. The syntax may not be limited to ChatML, and may for example use natural language, SQL, programming languages, or a proprietary syntax. Additional examples of roles assigned to the LLM may comprise, for example, a marketer or advertiser, screenwriter, playwright, podcaster, videographer, video game developer, software developer, musician, historian, artist, or a combination thereof.

At operation 1008, the query module 110 receives a response from the LLM. In some examples, the response may comprise a narrative in a natural language format, or another format requested by the user in their input. For example, a user may have specified a five-paragraph essay. In another example, the user may have requested an image. In another example, the user may have requested an audio recording by a synthesized voice, which may simulate one or more real or fictional people. In another example, the user may have requested a response in the format of a screenplay.

At operation 1010, the LLM response is provided via a user device 128. In some examples, the user device 128 may comprise any of a mobile device, an augmented reality or a virtual reality headset, and/or an audio device. In some examples, the displayed LLM response may be provided in the format as specified by the user, such as an image, text, audio, or a combination thereof.

At operation 1012, the user determines whether the LLM response is acceptable. In some examples, the user may provide feedback, such as whether the response from the LLM is acceptable, or whether it could be improved. If the user desires an iterative response to improve the response, the query module 110 returns to operation 1002 and receive user input.

At operation 1014, the query module 110 sends the LLM response to the server system 106 if the LLM response is acceptable. In some examples, the LLM response may be a single response from the LLM. In other examples, the LLM response may comprise a conversation between the user and the LLM. In some examples, the LLM response may only comprise the last response provided by the LLM.

Figure 11:
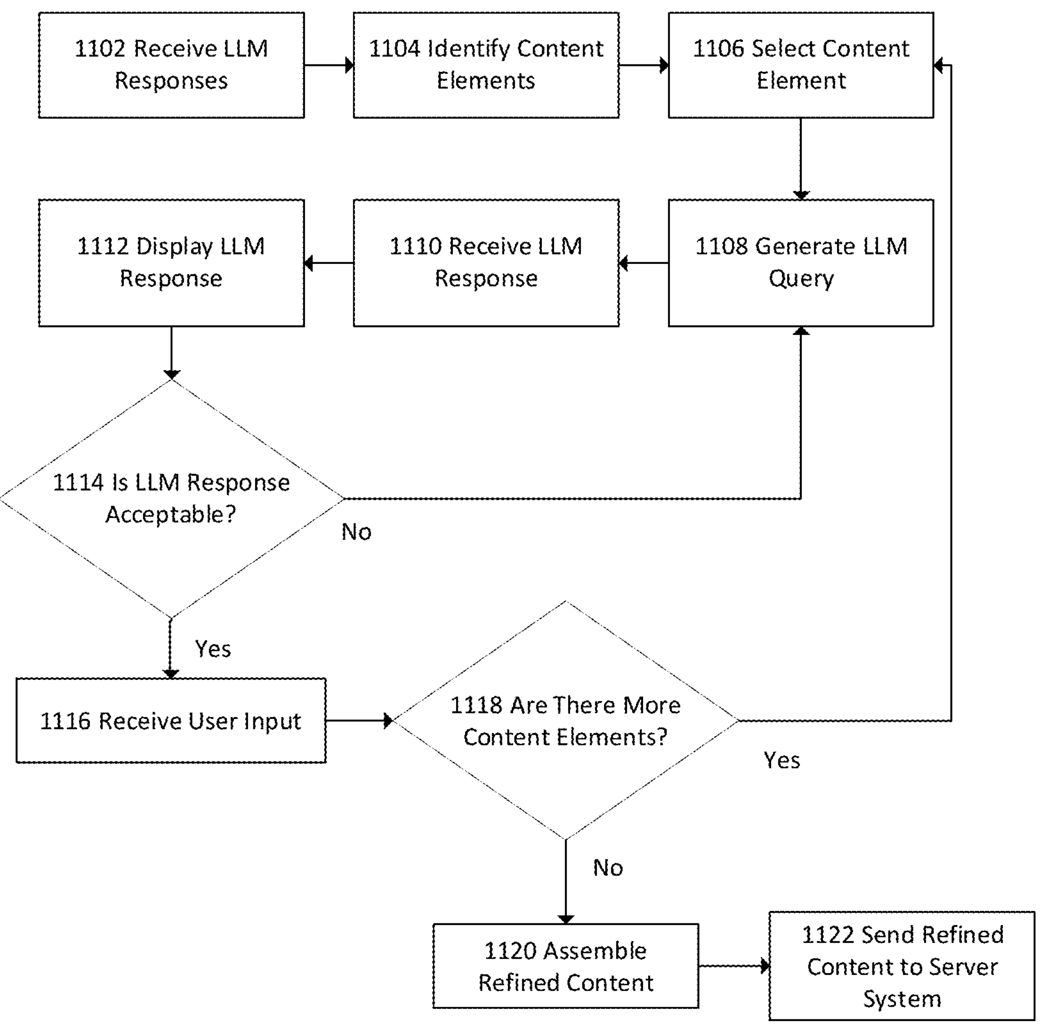
FIG. 11 is a flow diagram illustrating a process performed by iterative refinement module, in accordance with some examples.

FIG. 11 is a flow diagram illustrating a process performed by iterative refinement module, in accordance with some examples.

At operation 1102, the iterative refinement module 116 receives one or more responses from an LLM. The one or more responses may comprise responses to one or more queries based upon a user's input.

At operation 1104, the iterative refinement module 116 identifies one or more content elements. An example of a content element may be objects within a story such as people, places, things, and/or events. For example, a content element may be a baseball bat, a player who used the baseball bat, a game where the bat was used, a stadium where the bat was used, or a combination thereof.

At operation 1106, the iterative refinement module 116 selects a content element from the one or more identified content elements. In an example, the content element can be a baseball bat. For instance, considering the stage where a detailed description of a baseball bat (a selected content element) is generated, a user might find the initial detailed description somewhat lacking in depth. If so, the user can provide feedback through their device, suggesting that the description include more historical data or background on the bat, thereby linking it to a famous player who used a similar type of bat or referencing a notable game where a bat of that description played a significant role.

At operation 1108, the iterative refinement module 116 generates an LLM query relating to the selected content element. In an example, the LLM query comprises a request to generate a more detailed description of a baseball bat.

At operation 1110, the iterative refinement module 116 receives a response to the generated query related to the selected content element. Responding to the feedback, for example, the iterative refinement module 116 in the server system 106 may adapt and, in the next iteration, generates a query that prompts the LLM to provide a more richly textured description of the baseball bat, incorporating the historical or background data suggested by the user. The LLM can then generate a response that includes details about the era in which bats of this type were predominantly used, or notable moments in sports history where a bat with these characteristics had a significant impact. In some examples, the LLM response may provide additional detail relating to the selected content element, such as describing the bat as being made of white pine, a length of 33 inches, and having multiple grey smudges where the bat came in contact with a baseball. For example, the handle of the bat may further be coated with uneven deposits of pine tar.

At operation 1112, the LLM response is provided to the user via a user device, which may comprise any of a mobile device, an augmented reality or a virtual reality headset, and/or an audio device. In some examples, the displayed LLM response may be provided in the format as specified by the user, such as an image, text, audio, or a combination thereof.

At operation 1114, the iterative refinement module 116 allows the user to determine whether the LLM response is acceptable. In some examples, the user may provide feedback, such as whether the response from the LLM is acceptable, or whether it could be improved.

At operation 1116, the iterative refinement module 116 receives user input from a user, such as via a user device 128, with feedback. The feedback may be used to improve the generated query to improve the received LLM response. When the user determines that the LLM response is unacceptable, the iterative refinement module 116 returns to operation 1108 and generate another LLM query. This iterative process may continue, with the user having the opportunity to further refine the query with additional feedback, possibly suggesting the inclusion of specific materials or craftsmanship details that are characteristic of bats from that period, until a description meeting the user's standards and expectations is achieved. This refined content element, now with a rich backdrop and detailed depiction, can then be utilized in crafting a more immersive and comprehensive narrative.

At operation 1118, the iterative refinement module 116 allows the user to determine whether there are more content elements. There are more content elements if not all content elements have been selected and used to generate an LLM query to, for example, increase the amount of detail describing the content elements.

At operation 1118, the iterative refinement module 116 assembles the content elements and additional details to create refined content, such as a complete story or narrative. In some examples, the content elements may be assembled in the same order as the original content or may be arranged chronologically. Likewise, the content elements may be assembled based upon input by the user. At operation 1122, the iterative refinement module 116 sends the refined content to the server system 106.

Figure 12:
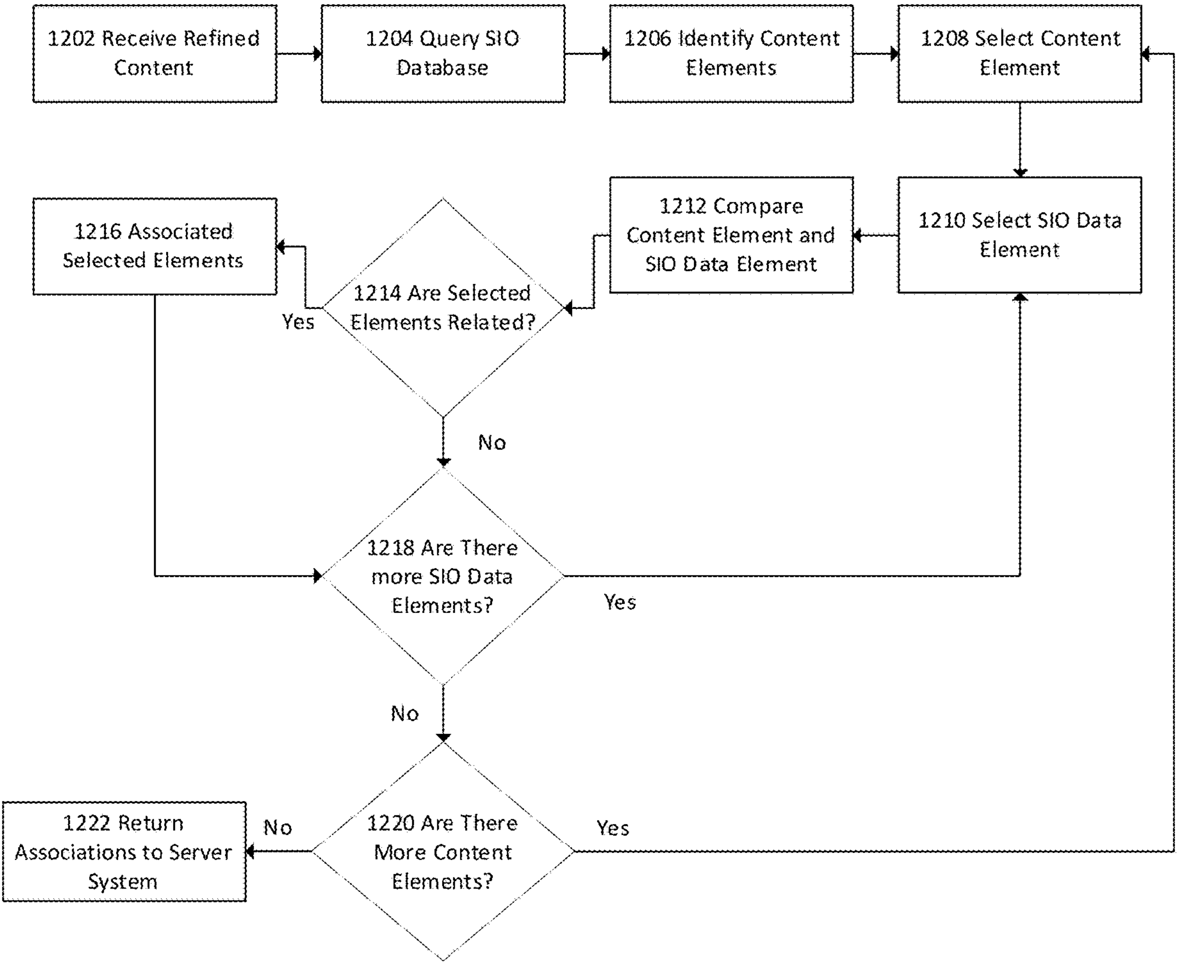
FIG. 12 is a flow diagram illustrating a process performed by object association module, in accordance with some examples.

FIG. 12 is a flow diagram illustrating a process performed by object association module, in accordance with some examples.

At operation 1202, the object association module 118 receives a refined content. In some examples, the refined content may comprise a detailed narrative, or other output at least in part from an LLM.

At operation 1204, the object association module 118 queries the SIO database 104 for data related to the refined content. In some examples, the queried data comprises data about baseball, particularly relating to bats. Examples of the data accessed from the SIO database may comprise baseball bats, players who used the bats, games played in which the bats were used, locations where they were used, such as stadiums where games were played, practices were held, or a combination thereof.

At operation 1206, the object association module 118 identifies one or more content elements in the refined content. Examples of a content element may be objects within a story such as people, places, things, events, or a combination thereof. For example, a content element may be a baseball bat, a player who used the baseball bat, a game where the bat was used, and/or a stadium where the bat was used.

At operation 1208, the object association module 118 selects a content element from the one or more identified content elements. In an example, the selected content element can be a baseball bat.

At operation 1210, the object association module 118 selects an SIO data element from the data received from querying the SIO database 104. In some examples, the SIO data element may comprise data related to a baseball bat.

At operation 1212, the object association module 118 compares the selected content element and the selected SIO data element to determine whether the selected content element is similar or related to the SIO data. For example, the selected content element is a baseball bat, and the SIO data element is Babe Ruth. Comparing the selected content element and the selected SIO data element comprises comparing attributes for commonality or relationships. In an alternative example, the object association module 118 heightens the validation and verification of information extracted from the SIO database 104 to further ensure the quality of outputs. After operation 1212, the module could involve a stringent validation process wherein the system cross-references the selected SIO data elements with other reputable data sources. This is to ascertain the reliability and accuracy of the information retrieved, by implementing algorithms that assess the credibility of the source data based on several predetermined criteria, including the reputation of the data source, data consistency with other reliable sources, and the timeliness of the data entry.

At operation 1214, the object association module 118 determines whether the selected content element and selected SIO data element are related. The selected content element may be related to and/or associated with the selected SIO data element if they share at least one common attribute or relationship, such as if the baseball bat was owned and/or used by Babe Ruth. In other examples, the bat may be related to Babe Ruth if the bat was used in the same game in which Babe Ruth played, or if the bat matches the characteristics, such as length, weight, material, if the bat used by Babe Ruth, and/or if Babe Ruth signed the bat. In some examples, associated elements may be saved, such as by hyperlinking or providing references to the SIO data elements in the refined content. This may facilitate access of the corresponding SIO element from the refined content.

At operation 1216, the object association module 118 associates the selected SIO data element to the selected content element of the refined content if the selected elements are related. In some examples, association may comprise embedding a reference or link in the refined content. For example, embedding a hyperlink in a virtual text or a footnote in a document. In some examples, the object association module 118 may incorporate a user validation phase as a part of operation 1216 where users are facilitated to scrutinize the associations generated by the system and provide feedback regarding the accuracy and relevance of these associations. This could be facilitated by deploying tools enabling users to affirm or refute the associations and suggest more accurate or detailed associations based on additional research or expertise. The user feedback could potentially be integrated into an ongoing learning process, helping in the continual enhancement of the quality and accuracy of the outputs generated by the object association module over time.

At operation 1218, the object association module 118 determines whether there are more SIO data elements which have not been evaluated. In some examples, there can be more SIO data elements. In such a case, the object association module 118 returns to operation 1210 and select another SIO data element. In another example, it can be determined that there are no more SIO data elements.

At operation 1220, the object association module 118 determines whether there are more content elements which have not been evaluated. In some examples, there can be more content elements. In such a case, the object association module 118 returns to operation 1208 and select another content element. In another example, there are no more content elements.

At operation 1222, the object association module 118 returns the associated SIO element references with the refined content to the server system 106. Furthermore, the system could implement a mechanism within operations 1218 and 1220 where the SIO database 104 undergoes regular updates and reviews, ensuring it retains the most current and verified data. This mechanism is vital in upholding the quality and reliability of the outputs generated by the object association module 118.

In some examples, the object association module 118 functions by first receiving a segment of refined content, for example, a detailed historical narrative generated partly through an LLM. Subsequently, it consults the SIO database 104 to gather pertinent data to the refined content. For example, by focusing on details surrounding a famous painting, like "Starry Night" by Vincent van Gogh. Identifying various content elements present in the refined content can ensue, pinpointing specifics such as the artist, the time period the artwork was created, the art style, and the physical characteristics of the painting. A chosen content element, such as the art style, can then be selected and juxtaposed with an SIO data element, the data delineating the characteristics of Post-Impressionism, for example.

In some examples, data elements may include details relating to the creation, completion, ownership, and impact on art history of "Starry Night," allowing a generated narrative or other creative work to include a plurality of significant details surrounding the object in order to create a more nuanced and integrative creative work. The included elements may be meticulously compared to the selected content and SIO data elements to determine if any common attributes or connections exist, for instance, evaluating whether the described art style in the narrative aligns with the characteristics of Post-Impressionism. For example, a creative work may utilize artistic elements associated with Post-Impressionism, such as naturalistic description of light and color, emphasis on abstract qualities or symbolic content in whatever form the creative work generated by the LLM may undertake (a novel, a screenplay, a poem, a musical work, or a combination thereof). Following this, a validation procedure might be initiated, wherein cross-referencing of the selected SIO data elements with data from other credible sources takes place to confirm the authenticity and accuracy of the retrieved information. If a relationship is discerned, such as identifying that the painting indeed exemplifies characteristics of Post-Impressionism, the elements are then linked, potentially by embedding a reference or hyperlink within the refined content, thereby facilitating easy access to the SIO data elements from the narrative. This example can also introduce a user validation phase, allowing users to evaluate the established associations and provide input concerning their correctness and relevance, fostering continual enhancement of the system's output quality. Subsequently, the system checks for other SIO or content elements that require evaluation, returning to select new elements if necessary, and repeating the process. Ultimately, the object association module 118 can deliver the associated SIO element references coupled with the refined content to server system 106, ensuring a product characterized by precise accuracy and reliability, enhancing user trust and satisfaction in the process.

In an illustrative example, the aforementioned process starts at operation 1202. At operation 1202, where the object association module 118 may receive refined content from an LLM, such as a message purportedly from Babe Ruth to Yankees fans. For instance, an LLM receives a prompt like "Write a message to a Yankees fan as if you were Babe Ruth," and produces an output, "All Ya Yankee fans, are the same. You're loyal, you support us through thick and thin, and for that, young fella, I'd like to say, Thank You and go Yankees." This output is tagged with an SIO Code.

At operation 1204, the object association module 118 may analyze the content by querying the SIO database 104 for related SIO data that the LLM incorporated in order to generate an output, which may be, for example, a transcript of "Babe Ruth's Retirement Speech at Yankee Stadium" or the full text of "Babe Ruth's Autobiography," each identified by their unique SIO Codes.

At operation 1206, the object association module 118 may identify content elements in the LLM output, for example, phrases or sentiments reflective of Ruth's style.

At operations 1208 and 1210, the object association module 118 compares the identified content elements with corresponding SIO data elements to establish relevance and authenticity. In some examples, this is to ensure that the connected SIO codes used as input to the LLM were faithfully represented in the output generated by the LLM.

At operation 1212, the object association module 118 may perform a detailed comparison, to ensure the LLM output aligns with the SIO data attributes.

At operation 1214, the object association module 118 may determines the association between the content and SIO data elements. If related, as confirmed in operation 1216, they are linked in the refined content, which may be, for example, embedding hyperlinks to Ruth's speeches or autobiography that would validate the word choice and tone of the LLM output. The process includes user validation, where users can scrutinize and give feedback on these associations. For example, the user may direct the system to another source of Babe Ruth related speeches, such as a YouTube video of Babe Ruth speaking at a press conference, that may be more relevant to the output. In some examples, this may update the output via the iterative refinement module 116, wherein the updated LLM output would be linked with the input source the user directed the system to, for example, a YouTube video of Babe Ruth speaking at a press conference, via the sources SIO code.

Figure 13:
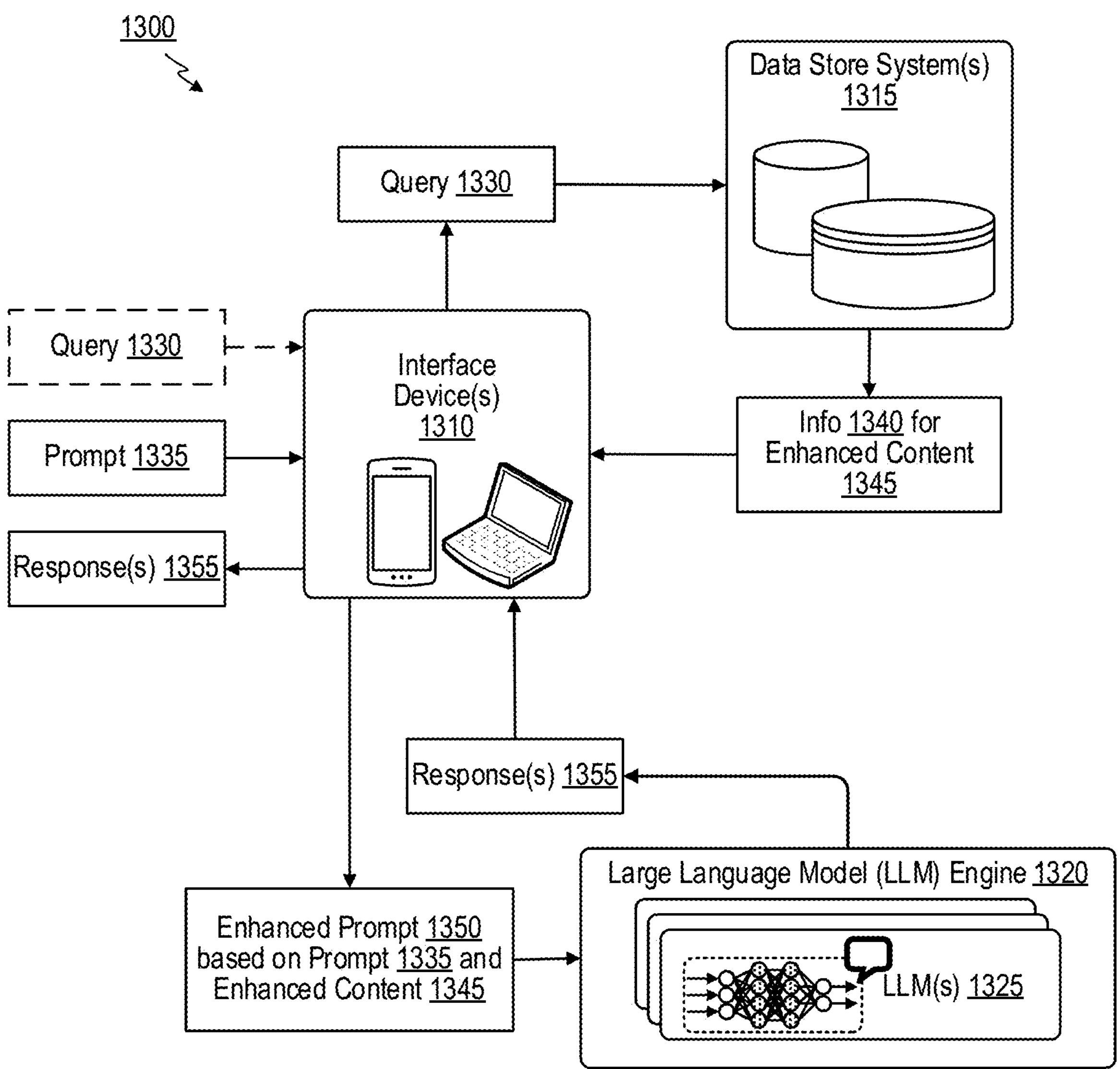
FIG. 13 is a block diagram illustrating a retrieval augmented generation (RAG) system that may be used to implement some aspects of the technology, in accordance with some examples.

FIG. 13 is a block diagram illustrating a retrieval augmented generation (RAG) system that may be used to implement some aspects of the technology. The RAG system 1300 includes one or more interface device(s) 1310 that can receive input(s) from a user and/or a user device 128, for instance by receiving a query 1330 and/or a prompt 1335 from the user and/or the system.

The interface device(s) 1310 can send the query 1330 to one or more data store system(s) 1315 that include, and/or that have access to (e.g., over a network connection), various data store(s) (e.g., database(s), table(s), spreadsheet(s), tree(s), ledger(s), heap(s), and/or other data structure(s)). The data store system(s) 1315 searches the data store(s) according to the query 1330. In some examples, the interface device(s) 1310 and/or the system(s) 1315 convert the query 1330 into tensor format (e.g., vector format and/or matrix format). In some examples, the data store system(s) 1315 searches the data store(s) (e.g., the SIO database 104) according to the query 1330 by matching the query 1330 with data in tensor format (e.g., vector format and/or matrix format) stored in the data store(s) that are accessible to the data store system(s) 1315. The data store system(s) 1315 retrieve, from the data store(s) and based on the query 1330, information 1340 that is relevant to generating enhanced content 1345.

In some examples, the data store system(s) 1315 provide the information 1340 and/or the enhanced content 1345 to the interface device(s) 1310. In some examples, the data store system(s) 1315 provide the information 1340 to the interface device(s) 1310, and the interface device(s) 1310 generate the enhanced content 1345 based on the information 1340. The device(s) 1310 provides the query 1330, the prompt 1335, the information 1340, the enhanced content 1345, and/or enhanced prompt 1350 based on prompt 1335 to one or more ML model(s) 1325 (e.g., ML model(s) 1425) of an ML engine 1320 (e.g., ML engine 1420). The ML model(s) 1325 generate response(s) 1355 that are responsive to the prompt 1335. In some examples, the response(s) 1355 may be, or may include, details and/or additional details of an object that the query is based on.

In some examples, the ML model(s) 1325 generate the response(s) 1355 (e.g., including the details of an object) based on the query 1330, the prompt 1335, the information 1340, the enhanced content 1345, and/or the enhanced prompt 1350. In some examples, the ML model(s) 1325 generate the response(s) 1355 to include, or be based on, the information 1340 and/or the enhanced content 1345. The ML model(s) 1325 provides the response(s) 1355 to the interface device(s) 1310. In some examples, the interface device(s) 1310 output the response(s) 1355 to the user (e.g., to the user device of the user) that provided the query 1330 and/or the prompt 1335. In some examples, the interface device(s) 1310 output the response(s) 1355 to the system (e.g., the other ML model) that provided the query 1330 and/or the prompt 1335 to the interface device(s) 1310. In some examples, the data store system(s) 1315 may include one or more ML model(s) that are trained to perform the search of the data store(s) based on the query 1330.

In some examples, the system(s) 1315 provides the information 1340 and/or the enhanced content 1345 directly to the ML model(s) 1325, and the interface device(s) 1310 provide the query 1330 and/or the prompt 1335 to the ML model(s) 1325. The ML engine 1320 may be an example of the ML engine 1420, or vice versa. The ML model(s) 1325 may be example(s) of the ML model(s) 1425, or vice versa.

In an illustrative example, the interface device(s) 1310 may receive the query 1330 to request the response(s) to include specific SIO elements comprising specific components of a musical object (e.g., guitars related to Carlos Santana). The corresponding prompt 1335 can include further information (e.g., request the response to be in a specific format and/or request response to be in specific types of components such as historical, descriptive, and/or emotional elements). The data store system(s) 1315 can interpret the query 1330 and search, based on the query 1330, the various data store(s) that the data store system(s) 1315 have access to, to output information 1340 identifying additional types of specific components about the musical object, emotions associated with the musical object, history associated with the musical object, descriptions involving the musical object, any other types of components of the musical object discussed herein, or a combination thereof.

The data store system(s) 1315 can output this information 1340 to the interface device(s) 1310, which can generate enhanced content 1345 and/or enhanced prompt 1350. In some examples, the enhanced content 1345 adds or appends the information 1340 to the prompt 1335 and/or the query 1330. In some examples, the data store system(s) 1315 and/or the interface device(s) 1310 generate the enhanced content 1345 and/or enhanced prompt 1350 by modifying the query 1330 and/or the prompt 1335 before providing the query 1330 and/or the prompt 1335 to the ML model(s) 1325. For instance, the data store system(s) 1315 and/or the interface device(s) 1310 can generate the enhanced content 1345 by modifying the query 1330 and/or the prompt 1335 to instruct the ML model(s) 1325 to generate the response(s)

1355 with specific SIO element(s). In this way, the ML model(s) 1325 do not need to seek out specific SIO element(s) (e.g., components of the musical object), because the query 1330 and/or the prompt 1335 are already modified to include this information. In this way, the ML model(s) 1325 are more optimally configured to generate response(s) that are accurate and factor in up-to-date SIO element(s) from the data store(s) that the data store system(s) 1315 have access to.

Figure 14:
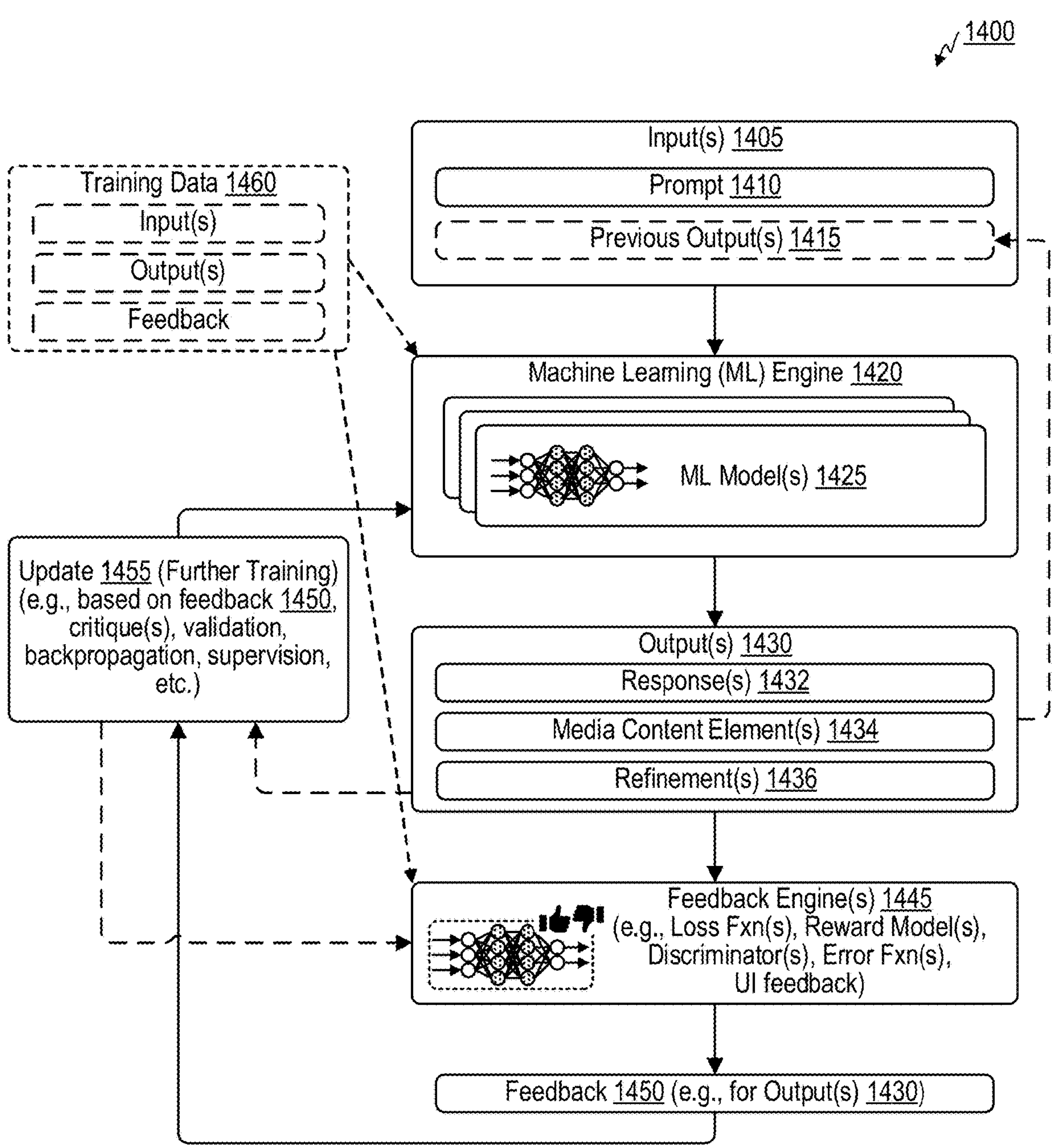
FIG. 14 is a block diagram illustrating an example of a machine learning system, in accordance with some examples.

FIG. 14 is a block diagram illustrating an example of a machine learning system 1400 for training and use of one or more machine learning model(s) 1425 used to generate response(s) 1432, media content element(s) 1434, and/or refinements(s) 1436. The refinement(s) 1436 can be refinements to response(s) 1432, and/or refinements to media content element(s) 1434. The machine learning (ML) system 1400 includes an ML engine 1420 that generates, trains, uses, and/or updates one or more ML model(s) 1425. In some examples, the interactive search and narrative generation system 100 include the ML system 1400, the ML engine 1420, the ML model(s) 1425, and/or the feedback engine(s) 1445, or vice versa.

The ML model(s) 1425 can include, for instance, one or more neural network(s) (NN(s)), one or more convolutional NN(s) (CNN(s)), one or more time delay NN(s) (TDNN(s)), one or more deep network(s) (DN(s)), one or more autoencoder(s) (AE(s)), one or more variational autoencoder(s) (VAE(s)), one or more deep belief net(s) (DBN(s)), one or more recurrent NN(s) (RNN(s)), one or more generative adversarial network(s) (GAN(s)), one or more conditional GAN(s) (cGAN(s)), one or more feed-forward network(s), one or more network(s) having fully connected layers, one or more support vector machine(s) (SVM(s)), one or more random forest(s) (RF), one or more computer vision (CV) system(s), one or more autoregressive (AR) model(s), one or more Sequence-to-Sequence (Seq2Seq) model(s), one or more large language model(s) (LLM(s)), one or more deep learning system(s), one or more classifier(s), one or more transformer(s), or a combination thereof. In examples where the ML model(s) 1425 include LLMs, the LLMs can include, for instance, a Generative Pre-Trained Transformer (GPT) (e.g., GPT-2, GPT-3, GPT-3.5, GPT-4, etc.), DaVinci or a variant thereof, an LLM using Massachusetts Institute of Technology (MIT)® langchain, Pathways Language Model (PaLM), Large Language Model Meta® AI (LLaMA), Language Model for Dialogue Applications (LaMDA), Bidirectional Encoder Representations from Transformers (BERT), Falcon (e.g., 40B, 7B, 1B), Orca, Phi-1, StableLM, variant(s) of any of the previously-listed LLMs, or a combination thereof.

Within FIG. 14, a graphic representing the ML model(s) 1425 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 1425 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 1425 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 1425 can include a feed-forward network, in which case there are no feedback connections where outputs of the network are fed back into itself. In some cases, the ML model(s) 1425 can include a recurrent neural network, which can have loops that allow information to be carried across nodes while reading in input. In some cases, the network can include a convolutional neural network, which may not link every node in one layer to every other node in the next layer.

One or more input(s) 1405 can be provided to the ML model(s) 1425. The ML model(s) 1425 can be trained by the ML engine 1420 (e.g., based on training data 1460) to generate one or more output(s) 1430. In some examples, the input(s) 1405 may include a prompt 1410. The prompt 1410 can include, for instance, an enhanced content, an enhanced prompt, or a combination thereof.

The output(s) 1430 that ML model(s) 1425 generate by processing the input(s) 1405 (e.g., the prompt 1410 and/or the previous output(s) 1415) can include response(s) 1432, media content element(s) 1434, and/or refinement(s) 1436. The response(s) 1432 is, for instance, a transcript that is responsive to the prompt 1410. For example, the response(s) 1432 can be a transcript in a text-based format with a series of sentences that answer the query that the prompt is seeking to ask. For example, the response(s) 1432 can be the following: "All Ya Yankee fans, are the same. You are loyal, you support us through thick and thin, and for that, young fella, I'd like to say, Thank You and go Yankees." The example response is produced based on the prompt that queries, "Write a message to a Yankees fan as if you were Babe Ruth." This example response can be generated based on a transcript (or at least a segment) of Babe Ruth's retirement speech at Yankee stadium or the full text of Babe Ruth's autobiography. The media content element(s) 1434 can include, for instance, objects within a story, such as people, places, things, and/or events. For example, where a media content element is a baseball bat, the objects can be a player who used the baseball bat, a game where the bat was used, and/or a stadium where the bat was used, or a combination thereof. The ML model(s) 1425 can generate the response(s) 1432 based on the prompt 1410 and/or other types of input(s) 1405 (e.g., previous output(s) 1415). In some examples, the response(s) 1432 can be used as part of the input(s) 1405 to the ML model(s) 1425 (e.g., as part of previous output(s) 1415) for identifying media content element(s) 1434, for generating refinement(s) 1436, and/or for generating other output(s) 1430. In some examples, the refinement(s) 1436 can be an assembly of media content element(s) 1434 that were selected by a user, based on the user's feedback (e.g., the user provides feedback with an input via an interface, where the input indicates whether the media content element(s) 1434 are an acceptable media content element(s) 1434 or not). In some examples, at least some of the previous output(s) 1415 in the input(s) 1405 represent previously-identified score(s) that are input into the ML model(s) 1425 to generate the response(s) 1432, identify media content element(s) 1434, and/or other output(s) 1430. In some examples, based on receipt of the input(s) 1405, the ML model(s) 1425 can select the output(s) 1430 from a list of possible outputs, for instance by ranking the list of possible outputs by likelihood, probability, and/or confidence based on the input(s) 1405. In some examples, based on receipt of the input(s) 1405, the ML model(s) 1425 can identify the output(s) 1430 at least in part using generative artificial intelligence (AI) content generation techniques, for instance using an LLM to generate custom text and/or graphics identifying the output(s) 1430.

In some examples, the ML system 1400 repeats the process illustrated in FIG. 14 multiple times to generate the output(s) 1430 in multiple passes, using some of the output(s) 1430 from earlier passes as some of the input(s) 1405 in later passes (e.g., as some of the previous output(s) 1415). For instance, in a first illustrative example, in a first pass, the ML model(s) 1425 can generate the response(s) 1432 based on the prompt 1410 into the ML model(s) 1425. In a second pass, the ML model(s) 1425 can identify the media content element(s) 1434 based on the prompt 1410 and the previous output(s) 1415 (that includes the response(s) 1432 from the first pass) into the ML model(s) 1425. In a third pass, the ML model(s) 1425 can generate refinement(s) 1436 based on the prompt 1410 and the previous output(s) 1415 (that includes the response(s) 1432 from the first pass and/or the media content element(s) 1434 from the second pass) into the ML model(s) 1425.

In some examples, the ML system includes one or more feedback engine(s) 1445 that generate and/or provide feedback 1450 about the output(s) 1430. In some examples, the feedback 1450 indicates how well the output(s) 1430 align to corresponding expected output(s), how well the output(s) 1430 serve their intended purpose, or a combination thereof. In some examples, the feedback engine(s) 1445 include loss function(s), reward model(s) (e.g., other ML model(s) that are used to score the output(s) 1430), discriminator(s), error function(s) (e.g., in back-propagation), user interface feedback received via a user interface from a user, or a combination thereof. In some examples, the feedback 1450 can include one or more alignment score(s) that score a level of alignment between the output(s) 1430 and the expected output(s) and/or intended purpose.

The ML engine 1420 of the ML system can update (further train) the ML model(s) 1425 based on the feedback 1450 to perform an update 1455 (e.g., further training) of the ML model(s) 1425 based on the feedback 1450. In some examples, the feedback 1450 includes positive feedback, for instance indicating that the output(s) 1430 closely align with expected output(s) and/or that the output(s) 1430 serve their intended purpose. In some examples, the feedback 1450 includes negative feedback, for instance indicating a mismatch between the output(s) 1430 and the expected output(s), and/or that the output(s) 1430 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback.

In response to positive feedback in the feedback 1450, the ML engine 1420 can perform the update 1455 to update the ML model(s) 1425 to strengthen and/or reinforce weights (and/or connections and/or hyperparameters) associated with generation of the output(s) 1430 to encourage the ML engine 1420 to generate similar output(s) 1430 given similar input(s) 1405. In this way, the update 1455 can improve the ML model(s) 1425 itself by improving the accuracy of the ML model(s) 1425 in generating output(s) 1430 that are similarly accurate given similar input(s) 1405. In response to negative feedback in the feedback 1450, the ML engine 1420 can perform the update 1455 to update the ML model(s) 1425 to weaken and/or remove weights (and/or connections and/or hyperparameters) associated with generation of the output(s) 1430 to discourage the ML engine 1420 from generating similar output(s) 1430 given similar input(s) 1405. In this way, the update 1455 can improve the ML model(s) 1425 itself by improving the accuracy of the ML model(s) 1425 in generating output(s) 1430 are more accurate given similar input(s) 1405. In some examples, for instance, the update 1455 can improve the accuracy of the ML model(s) 1425 in generating output(s) 1430 by reducing false positive(s) and/or false negative(s) in the output(s) 1430.

For instance, here, if the response(s) 1432 are successfully used to identify media content element(s) 1434 and/or the generating of the refinement(s) 1436 is successful, this success can be interpreted as feedback 1450 that is positive (e.g., positive feedback). On the other hand, if the response(s) 1432 are not usable to identify the media content element(s) 1434, and/or the generating of the refinement 1436 fails or is unsuccessful, this failure or lack of success can be interpreted as feedback 1450 that is negative (e.g., negative feedback). Either way, the update 1455 can improve the machine learning system 1400 and the overall system by improving the consistency with which the outputting an arrangement of at least a subset of the plurality of data elements is successful.

In some examples, the ML engine 1420 can also perform an initial training of the ML model(s) 1425 before the ML model(s) 1425 are used to generate the output(s) 1430 based on the input(s) 1405. During the initial training, the ML engine 1420 can train the ML model(s) 1425 based on training data 1460. In some examples, the training data 1460 includes examples of input(s) (of any input types discussed with respect to the input(s) 1405), output(s) (of any output types discussed with respect to the output(s) 1430), and/or feedback (of any feedback types discussed with respect to the feedback 1450). In some cases, positive feedback in the training data 1460 can be used to perform positive training, to encourage the ML model(s) 1425 to generate output(s) similar to the output(s) in the training data given input of the corresponding input(s) in the training data. In some cases, negative feedback in the training data 1460 can be used to perform negative training, to discourage the ML model(s) 1425 from generate output(s) similar to the output(s) in the training data given input of the corresponding input(s) in the training data. In some examples, the training of the ML model(s) 1425 (e.g., the initial training with the training data 1460, update(s) 1455 based on the feedback 1450, and/or other modification(s)) can include fine-tuning of the ML model(s) 1425, retraining of the ML model(s) 1425, or a combination thereof.

In some examples, the ML model(s) 1425 can include an ensemble of multiple ML models, and the ML engine 1420 can curate and manage the ML model(s) 1425 in the ensemble. The ensemble can include ML model(s) 1425 that are different from one another to produce different respective outputs, which the ML engine 1420 can average (e.g., mean, median, and/or mode) to identify the output(s) 1430. In some examples, the ML engine 1420 can calculate the standard deviation of the respective outputs of the different ML model(s) 1425 in the ensemble to identify a level of confidence in the output(s) 1430. In some examples, the standard deviation can have an inverse relationship with confidence. For instance, if the respective outputs of the different ML model(s) 1425 are very different from one another (and thus have a high standard deviation above a threshold), the confidence that the output(s) 1430 are accurate may be low (e.g., below a threshold). On the other hand, if the respective outputs of the different ML model(s) 1425 are equal or very similar to one another (and thus have a low standard deviation below a threshold), the confidence that the output(s) 1430 are accurate may be high (e.g., above a threshold). In some examples, different ML models(s) 1425 in the ensemble can include different types of models. In some examples, the ensemble may include different ML model(s) 1425 that are trained to process different inputs of the input(s) 1405 and/or to generate different outputs of the output(s) 1430. For instance, in some examples, a first model (or set of models) can process the input(s) 1405 to generate the response(s) 1432, while a second model (or set of models) can process the input(s) 1405 to identify media content element(s) 1434. In some examples, the ML engine 1420 can choose specific ML model(s) 1425 to be included in the ensemble because the chosen ML model(s) 1425 are effective at accurately processing particular types of input(s) 1405, are effective at accurately generating particular types of output(s) 1430, are generally accurate, process input(s) 1405 quickly, generate output(s) 1430 quickly, are computationally efficient, have higher or lower degrees of uncertainty than other models in the ensemble, or a combination thereof.

In some examples, one or more of the ML model(s) 1425 can be initialized with weights, connections, and/or hyperparameters that are selected randomly. This can be referred to as random initialization. These weights, connections, and/or hyperparameters are modified over time through training (e.g., initial training with the training data 1460 and/or update(s) 1455 based on the feedback 1450), but the random initialization can still influence the way the ML model(s) 1425 process data, and thus can still cause different ML model(s) 1425 (with different random initializations) to produce different output(s) 1430. Thus, in some examples, different ML model(s) 1425 in an ensemble can have different random initializations.

As an ML model (of the ML model(s) 1425) is trained (e.g., along the initial training with the training data 1460, update(s) 1455 based on the feedback 1450, and/or other modification(s)), different versions of the ML model at different stages of training can be referred to as checkpoints. In some examples, after each new update to a model (e.g., update 1455) generates a new checkpoint for the model, the ML engine 1420 tests the new checkpoint (e.g., against testing data and/or validation data where the correct output(s) are known) to identify whether the new checkpoint improves over older checkpoints or not, and/or if the new checkpoint introduces new errors (e.g., false positive(s) and/or false negative(s)). This testing can be referred to as checkpoint benchmark scoring. In some examples, in checkpoint benchmark scoring, the ML engine 1420 produces a benchmark score for one or more checkpoint(s) of one or more ML model(s) 1425, and keeps the checkpoint(s) that have the best (e.g., highest or lowest) benchmark scores in the ensemble. In some examples, if a new checkpoint is worse than an older checkpoint, the ML engine 1420 can revert to the older checkpoint. The benchmark score for a can represent a level of accuracy of the checkpoint and/or number of errors (e.g., false positive or false negative) by the checkpoint during the testing (e.g., against the testing data and/or the validation data). In some examples, an ensemble of the ML model(s) 1425 can include multiple checkpoints of the same ML model.

In some examples, the ML model(s) 1425 can be modified, either through the initial training (with the training data 1460), an update 1455 based on the feedback 1450, or another modification to introduce randomness, variability, and/or uncertainty into an ensemble of the ML model(s) 1425. In some examples, such modification(s) to the ML model(s) 1425 can include dropout (e.g., Monte Carlo dropout), in which one or more weights or connections are selected at random and removed. In some examples, dropout can also be performed during inference, for instance to modify the output(s) 1430 generated by the ML model(s) 1425. The term Bayesian Machine Learning (BML) can refer to random dropout, random initialization, and/or other randomization-based modifications to the ML model(s) 1425. In some examples, the modification(s) to the ML model(s) 1425 can include a hyperparameter search and/or adjustment of hyperparameters. The hyperparameter search can involve training and/or updating different ML models 1425 with different values for hyperparameters and evaluating the relative performance of the ML models 1425 (e.g., against (e.g., against testing data and/or validation data where the correct output(s) are known) to identify which of the ML models 1425 performs best. Hyperparameters can include, for instance, temperature (e.g., influencing level creativity and/or randomness), top P (e.g., influencing level creativity and/or randomness), frequency penalty (e.g., to prevent repetitive language between one of the output(s) 1430 and another), presence penalty (e.g., to encourage the ML model(s) 1425 to introduce new data in the output(s) 1430), other parameters or settings, or a combination thereof.

In some examples, the ML engine 1420 can perform retrieval-augmented generation (RAG) using the model(s) 1425. For instance, in some examples, the ML engine 1420 can pre-process the input(s) 1405 by retrieving additional information from one or more data store(s) (e.g., any of the databases and/or other data structures discussed herein) and using the additional information to enhance the input(s) 1405 before the input(s) 1405 are processed by the ML model(s) 1425 to generate the output(s) 1430. For instance, in some examples, the enhanced versions of the input(s) 1405 can include the additional information that the ML engine 1420 retrieved from the from one or more data store(s). In some examples, this RAG process provides the ML model(s) 1425 with more relevant information, allowing the ML model(s) 1425 to generate more accurate and/or personalized output(s) 1430.

FIG. 15 is a flow diagram illustrating an example of a process for machine learning based processing, in accordance with some examples. Operations are performed using an analysis system, which may include, for instance, the interactive search and narrative generation system 100, the first system 102, the server system 106, the second system 120, the user device 128, system(s) that perform any of the process(es) illustrated in the flow diagrams through FIGS. 3 through 7, and 9 through 12, a computing system and/or computing device with at least one processor performing instructions stored in at least one memory (and/or in a non-transitory computer-readable storage medium), a system, and apparatus, or a combination thereof.

At operation 1505, the analysis system analyzes a text-based input to extract a plurality of natural language elements. In some examples, the text-based input can be a user generated input through a user interface. In some examples, the text-based input can be associated with an object. For example, the object can be objects within a story and/or a narrative, such as people, places, things, and/or events. In some examples, the plurality of natural language elements can be content elements extracted from the text-based input.

At operation 1510, the analysis system generates a prompt from at least a subset of the plurality of natural language elements. In some examples, the prompt represents a search query for a search. In some examples, the response represents a search result of the search. In some examples, the prompt may be a query and/or instructions provided by the user. For example, the user provides an instruction, "Write a message to a Yankees fan as if you were Babe Ruth." In some examples, the plurality of natural language elements can be content elements extracted from a prompt. In some examples, the plurality of natural language elements include a plurality of tokens.

At operation 1515, the analysis system analyzes the prompt using a trained machine learning model to generate a response. In some examples, the response has at least one of a natural language format or a table format. In some examples, the response is responsive to the prompt. For example, the response for an instruction above can be "All Ya Yankee fans, are the same. You are loyal, you support us through thick and thin, and for that, young fella, I'd like to say, Thank You and go Yankees."

At operation 1520, the analysis system analyzes the response to extract a plurality of media content elements. In some examples, the plurality of media content elements include one or more Social Identify of Objects (SIO) data elements. In some examples, the different aspects of the object include at least one of people, places, physical properties, origination, emotions, cultures, or events. In some examples, the analysis system filters a subset of the different aspects of the object from the response based on the prompt.

In some examples, the analysis system receives a voice clip and interprets the voice clip using a speech-to-text algorithm to generate the text-based input. In some examples, the analysis system queries at least one data structure using a data structure query to retrieve contextual data, and by modifying the prompt using the contextual data before analyzing the prompt using the trained machine learning model. In some examples, the analysis system analyzes the plurality of media content elements to identify a shared attribute of at least a subset of the plurality of media content elements, and searches a data structure for the shared attribute to retrieve one or more additional media content elements from the data structure. For example, the analysis system queries the SIO database using structured queries to retrieve data that share similar attributes, and therefore related to the structured queries. In some examples, the data structure query is based on the text-based input.

In some examples, the analysis system receives feedback associated with the plurality of media content elements and update the trained machine learning model based on the feedback to improve an accuracy of the trained machine learning model. In some examples, the analysis system receives the feedback that is based on a user input, and refines the plurality of media content elements based on the feedback. In some examples, the analysis system analyzes the plurality of media content elements to generate a score. In this example, the score can be associated with at least one of an accuracy of the search result, a responsiveness of the search result to the search query. In some examples, the generation of the score is based on cross-referencing the plurality of media content elements with one or more data sources. In some examples, the score is adjusted after the generation based on comparison results of the plurality of media content elements with the different aspects of the object.

What is claimed is:

1. A method for scored searching, the method comprising:

analyzing a text-based input to extract a plurality of natural language elements from the text-based input, wherein the text-based input is associated with a physical object;

generating a prompt from at least a subset of the plurality of natural language elements, wherein the prompt represents a search query for a search;

analyzing the prompt using a trained machine learning model to generate a response, wherein the response is responsive to the prompt and represents a search result of the search;

analyzing the response to extract a plurality of media content elements from the response, wherein the plurality of media content elements corresponds to different aspects of the physical object; and analyzing the plurality of media content elements to generate a score, wherein the score is associated with at least one of an accuracy of the search result or a responsiveness of the search result to the search query.

2. The method of claim 1, further comprising receiving the text-based input with a user interface.

3. The method of claim 1, further comprising:

querying at least one data structure using a data structure query to retrieve contextual data, wherein the data structure query is based on the text-based input; and modifying the prompt using the contextual data before analyzing the prompt using the trained machine learning model.

4. The method of claim 1, wherein the plurality of natural language elements includes a plurality tokens.

5. The method of claim 1, wherein the score is based on cross-referencing of the plurality of media content elements with one or more data sources.

6. The method of claim 1, further comprising:

adjusting the score based on a comparison between the plurality of media content elements and the different aspects of the physical object.

7. The method of claim 1, further comprising:

receiving feedback, wherein the feedback is based on a user input; and refining the plurality of media content elements based on the feedback.

8. The method of claim 7, further comprising:

analyzing the plurality of media content elements after refining the plurality of media content elements to identify additional media content elements that correspond to additional aspects of the physical object; and associating the additional media content elements by providing references to the additional aspects of the physical object.

9. The method of claim 1, further comprising:

receiving a voice clip; and interpreting the voice clip using a speech-to-text algorithm to generate the text-based input.

10. The method of claim 1, wherein the plurality of media content elements includes one or more Social Identify of Objects (SIO) data elements.

11. The method of claim 1, further comprising:

analyzing the plurality of media content elements to identify a shared attribute of at least a subset of the plurality of media content elements; and searching a data structure for the shared attribute to retrieve one or more additional media content elements from the data structure.

12. The method of claim 1, wherein the different aspects of the physical object include at least one of people, places, physical properties, origination, emotions, cultures, or events.

13. The method of claim 1, further comprising:

filtering a subset of the different aspects of the physical object from the response based on the prompt.

14. The method of claim 1, wherein the response has at least one of a natural language format or a table format.

15. The method of claim 1, further comprising:

receiving feedback associated with the plurality of media content elements; and updating the trained machine learning model based on the feedback to improve an accuracy of the trained machine learning model.

16. A system for scored searching, the system comprising:

a memory that stores instructions; and a processor that executes the instructions, wherein execution of the instructions by the processor causes the processor to:

analyze a text-based input to extract a plurality of natural language elements from the text-based input, wherein the text-based input is associated with a physical object;

generate a prompt from at least a subset of the plurality of natural language elements, wherein the prompt represents a search query for a search;

analyze the prompt using a trained machine learning model to generate a response, wherein the response is responsive to the prompt and represents a search result of the search;

analyze the response to extract a plurality of media content elements from the response, wherein the plurality of media content elements corresponds to different aspects of the physical object; and analyze the plurality of media content elements to generate a score, wherein the score is associated with at least one of an accuracy of the search result or a responsiveness of the search result to the search query.

17. The system of claim 16, wherein the execution of the instructions by the processor causes the processor to:

query at least one data structure using a data structure query to retrieve contextual data, wherein the data structure query is based on the text-based input; and modify the prompt using the contextual data before analyzing the prompt using the trained machine learning model.

18. The system of claim 16, wherein the execution of the instructions by the processor causes the processor to receive the text-based input with a user interface.

19. The system of claim 16, wherein the score is based on cross-referencing of the plurality of media content elements with one or more data sources.

20. The system of claim 16, wherein the execution of the instructions by the processor causes the processor to:

adjust the score based on a comparison between the plurality of media content elements and the different aspects of the physical object.

* * * * *